United States Patent
Ford et al.

(10) Patent No.: US 11,686,100 B2
(45) Date of Patent: Jun. 27, 2023

(54) ROOF SHINGLE DAMAGE IDENTIFICATION CLIP, SYSTEM, AND METHODS

(71) Applicants: James B. Ford, Dublin, OH (US); Eric Edward Hunter Evans, Columbus, OH (US)

(72) Inventors: James B. Ford, Dublin, OH (US); Eric Edward Hunter Evans, Columbus, OH (US); Steve Sauer, Columbus, OH (US); Jacob Tesmer, Columbus, OH (US)

(*) Notice: Subject to any disclaimer, the term of this patent is extended or adjusted under 35 U.S.C. 154(b) by 0 days.

(21) Appl. No.: 17/177,141

(22) Filed: Feb. 16, 2021

(65) Prior Publication Data

US 2021/0348392 A1 Nov. 11, 2021

Related U.S. Application Data

(60) Provisional application No. 62/976,845, filed on Feb. 14, 2020.

(51) Int. Cl.
*E04D 15/02* (2006.01)

(52) U.S. Cl.
CPC .................................. *E04D 15/02* (2013.01)

(58) Field of Classification Search
CPC .. F16B 5/0635; F16B 2/20; F16B 2/22; F16B 2/24; F16B 2/245; E04D 13/076; E04D 13/00; E04D 13/006; E04D 2015/045; E04D 15/02; E04D 15/025

See application file for complete search history.

(56) References Cited

U.S. PATENT DOCUMENTS

| | | | | |
|---|---|---|---|---|
| 1,366,703 | A * | 1/1921 | Peter | E04D 13/10 52/24 |
| 3,296,750 | A * | 1/1967 | Zaleski | E04D 13/10 52/24 |
| 4,936,060 | A * | 6/1990 | Gelinas | G08B 19/02 52/2.17 |
| 5,165,642 | A * | 11/1992 | Rihaly | E04D 15/02 248/237 |
| 5,655,334 | A * | 8/1997 | Kwiatkowski | E04D 13/10 52/24 |
| 7,874,105 | B2 * | 1/2011 | Jacobs | E04D 1/20 52/26 |
| 9,596,926 | B1 * | 3/2017 | Volmer | A45F 5/02 |
| 10,612,242 | B1 * | 4/2020 | Cox, Jr. | E04D 13/10 |
| 2021/0087818 | A1 * | 3/2021 | Hagler | E04D 13/106 |

* cited by examiner

*Primary Examiner* — Jessica L Laux
(74) *Attorney, Agent, or Firm* — MIP Legal, Ltd.; Bryce D. Miracle, Esq.

(57) ABSTRACT

In accordance with a version, one or more identification clips, identification clip systems, and methods are provided which safely attach to and identify a plurality of damaged shingles to visually demonstrate and ascertain the extent of roof damage from a distance, particularly from the perspective of someone standing on the ground.

14 Claims, 31 Drawing Sheets

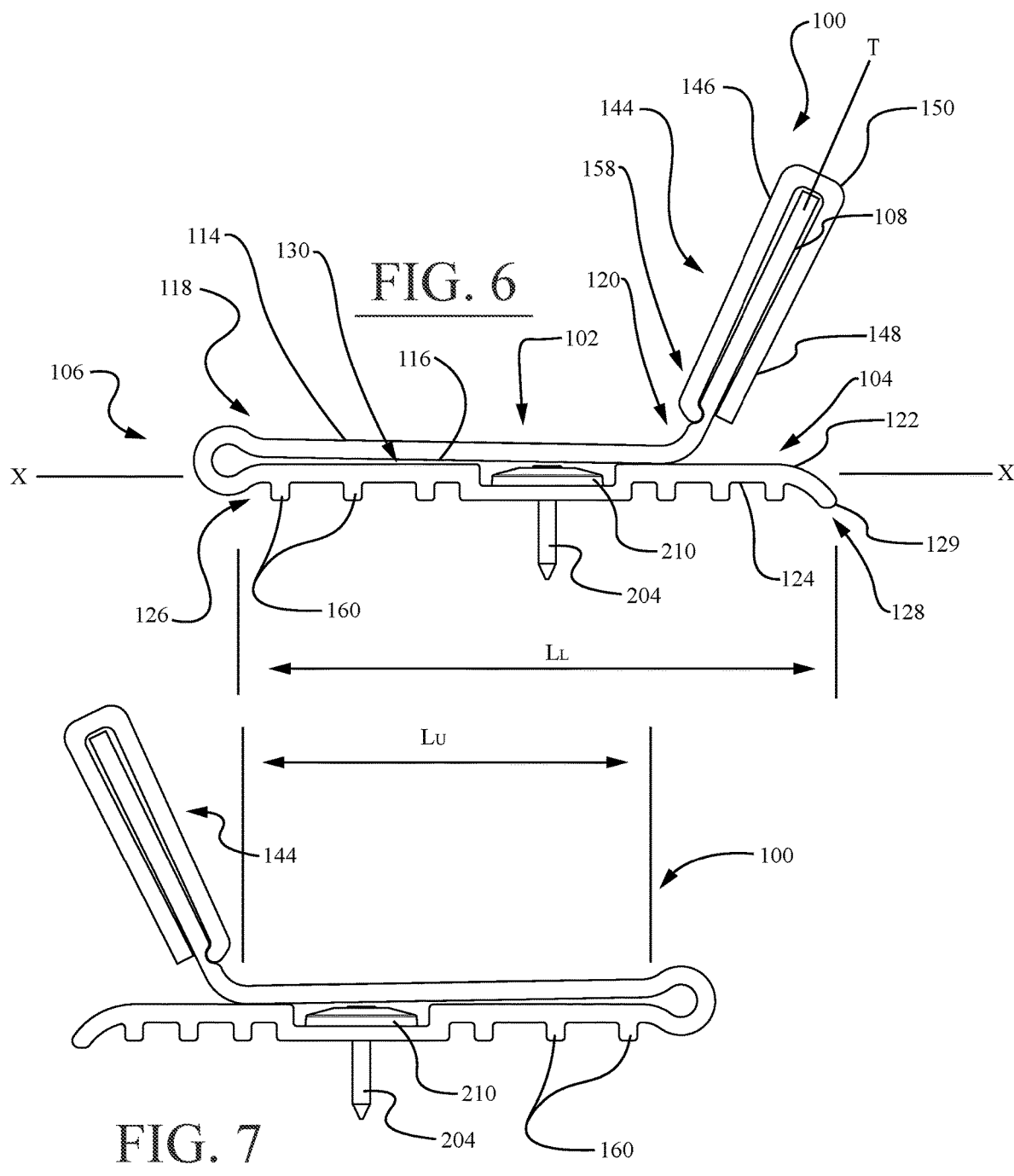

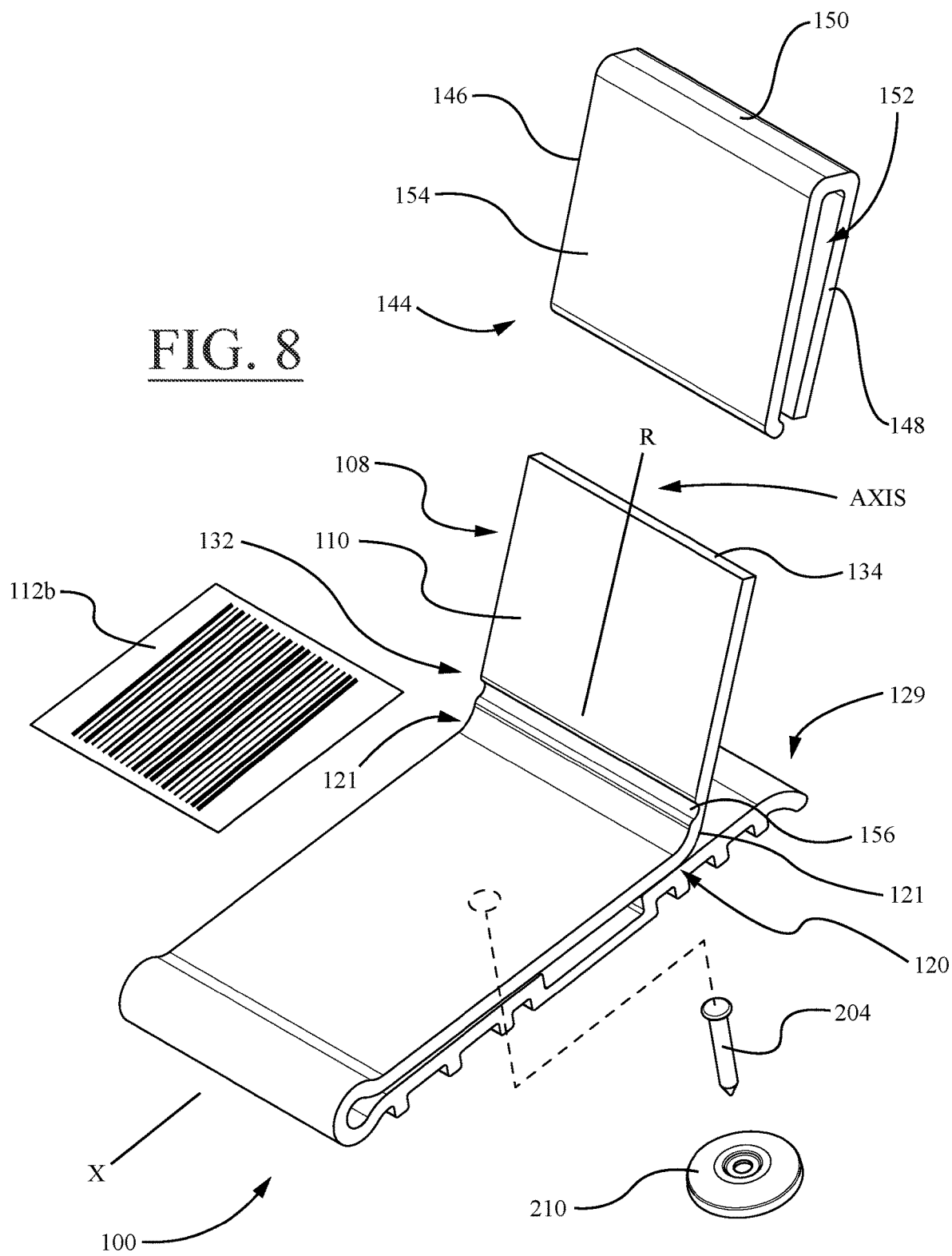

ROOF SHINGLE DAMAGE IDENTIFICATION CLIP, SYSTEM, AND METHODS

CROSS-REFERENCE TO RELATED APPLICATION

This application is based upon and claims the priority filing date of the previously filed, U.S. provisional patent application entitled "ROOF SHINGLE DAMAGE IDENTIFICATION CLIP, SYSTEM, AND METHODS" filed Feb. 14, 2020, having App. No. 62/976,845, the entire disclosure of which is hereby incorporated herein by reference.

FIELD OF INVENTION

The present invention relates to an identification clip attachable to a roof shingle.

BACKGROUND

By way of background, it is good practice to perform routine roof inspections to identify damaged shingles that are torn, cracked, curled or even missing altogether. Often roof damage can appear after adverse weather conditions including rain, sleet, hail, wind, fallen trees, and other debris. Typically, homeowner's insurance policies will cover the cost to repair damage to roofs caused by mother nature and other unforeseen incidents. Thereafter, it's imperative that a roofing expert initially review and analyze the roof structure to ascertain the level of damage and provide an estimate to either fix the affected shingles or replace the entirety of the roof. Typically, a representative of either a qualified roofing company or the insurance company identifies damaged shingles by visually inspecting the roof directly at the roof level. Once the damage has been identified, the representative assesses the damage by estimating how much it will cost to repair or replace the damaged property. The insurance company then issues payment to the insurance policy holder based on the estimated cost.

Currently, after the initial direct roof level review and assessment of roof damage, it is difficult for persons from the ground level to visually ascertain the level and quantity of roof damage.

For the foregoing reasons, there is a need for a device which is capable of temporarily identifying damaged shingles which can be easily viewable from ground level.

SUMMARY

In accordance with the invention, an identification clip, identification clip system, and methods are uniquely configured to for identifying and safely attaching to a plurality of damaged shingles in order to visually demonstrate and ascertain the extent of roof damage from afar, particularly from the perspective of someone standing on the ground.

In a version of the invention, the roof shingle identification clip for visually marking a damaged shingle generally comprises: i) an upper platform having a top surface, bottom surface, forward end and a rear end, the upper platform extending between the forward end and a rear end along an upper platform longitudinal axis, the top surface operably configured to display a visual identifier; ii) a lower platform having a top surface, a bottom surface, forward end and a rear end, the lower platform extending between the forward end and the rear end along a lower platform longitudinal axis; iii) a biasing member connecting the forward end of the upper platform and the forward end of the lower platform, wherein the biasing member urges the upper platform and the lower platform towards the other and forms a narrow column adapted to receive and grip the length of a shingle therein; and iv) a tab member extending upward from the rear end of the upper platform along a tab member longitudinal axis and terminating at an upper edge, the tab comprising a front face for displaying a visual identifier viewable from the perspective of a person standing on the ground.

In certain versions of the application, the identification may further comprise an optional detachable member having a front face for displaying a visual identifier, wherein the detachable member is adapted to couple and attach with the tab member.

In other certain versions of the application, the identification clip lower platform bottom surface further comprises a plurality of laterally extending ribs forming channels therebetween, thereby providing a superior grip with the surface of the shingle.

In yet another embodiment, the lower platform may further include a recessed portion having an upward facing flat surface and a bottom flat surface, the recessed portion having a central nail hole extending therethrough operably configured for receiving and supporting a nail, whereby the upward facing flat surface is configured to receive an umbrella type roofing nail having a washer and the bottom flat surface is adapted to seat flush with the roof shingle top surface.

In select versions of the application, the trailing edge of the lower plate further comprises a flange extending downward at an angle.

Preferably, the angle formed between the lower platform longitudinal axis and the tab member longitudinal axis is between 80-180 degrees.

Preferably, while attached to a shingle, the angle formed between the surface of the shingle and the tab front face is between 80-180 degrees.

In certain embodiments, the upper platform has a longitudinal length and the lower platform has a longitudinal length, wherein the upper platform longitudinal length is equal to or less than the lower platform longitudinal length.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where:

FIG. 6 is a right-side elevation view of the version shown in FIG. 1;

FIG. 7 is a left-side elevation view of the version shown in FIG. 1;

FIG. 8 is an exploded view of the version shown in FIG. 1;

DETAILED DESCRIPTION

Referring now to the figures wherein the showings are for purposes of illustrating a preferred version of the invention only and not for purposes of limiting the same, the present invention is a unique identification clip for identifying a plurality of damaged shingles in order to visually demonstrate and ascertain the extent of roof damage from afar, particularly from the perspective of someone standing on the ground. The identification clip is designed to easily, without causing damage, attach to and identify the affected one or more shingles.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense, but is made merely for the purpose of illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Figure 1:
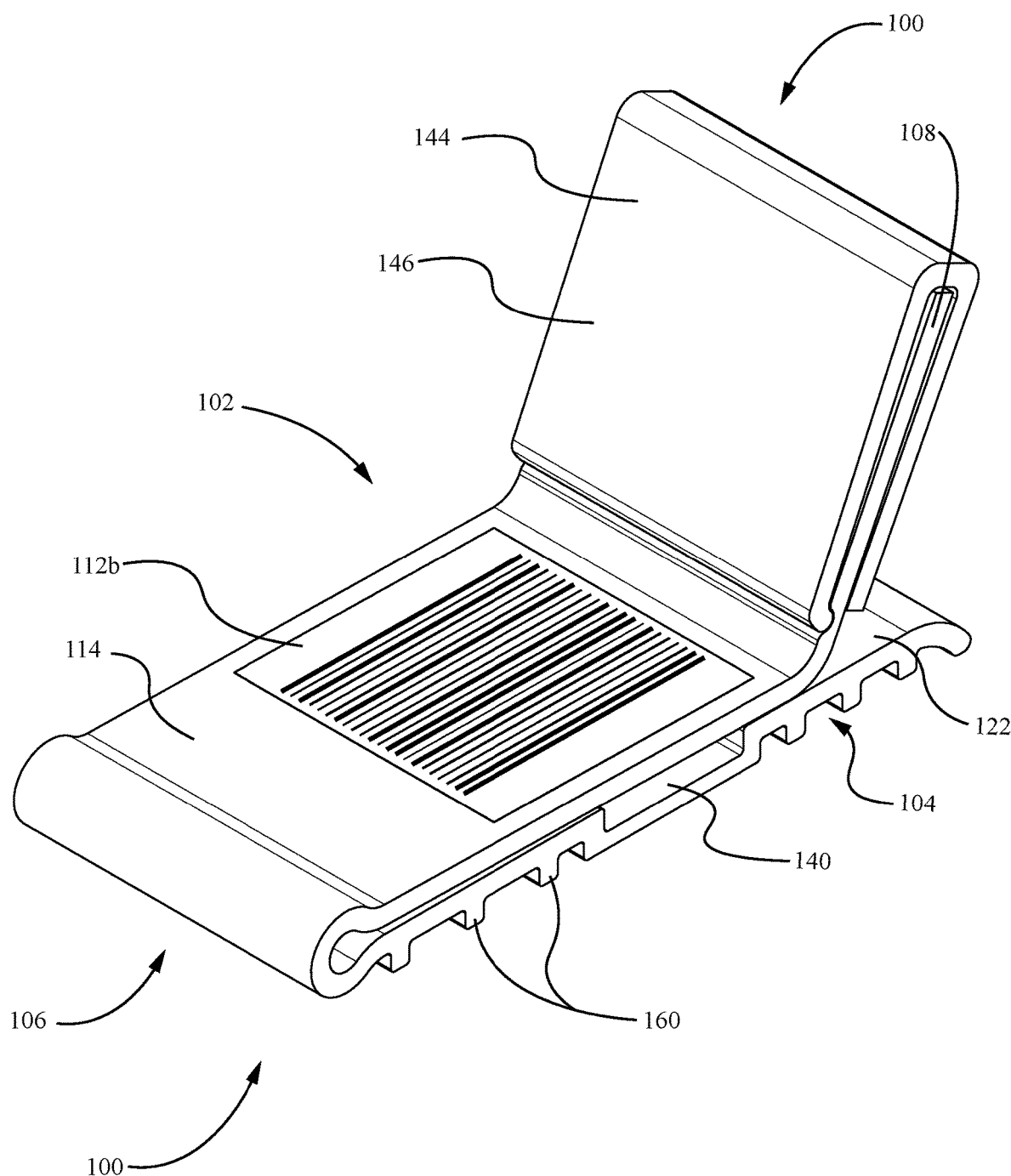
FIG. 1 is front perspective view of a version of the application.
Figure 2:
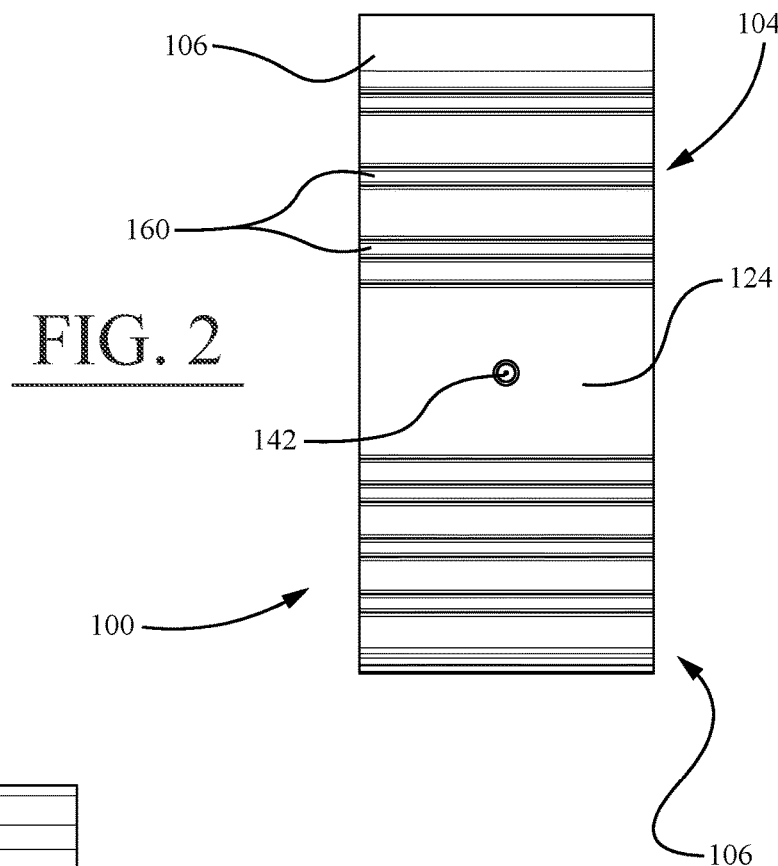
FIG. 2 is a bottom plan view of the version shown in FIG. 1.
Figure 3:
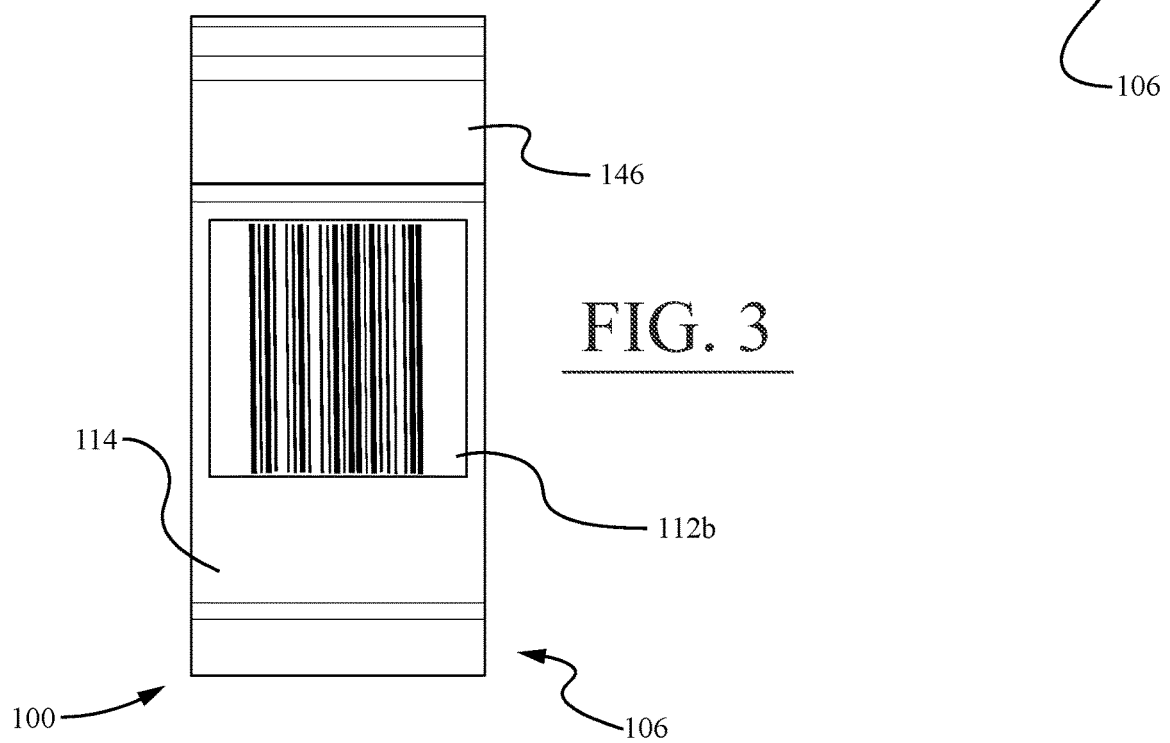
FIG. 3 is a top plan view of the version shown in FIG. 1.
Figure 4:
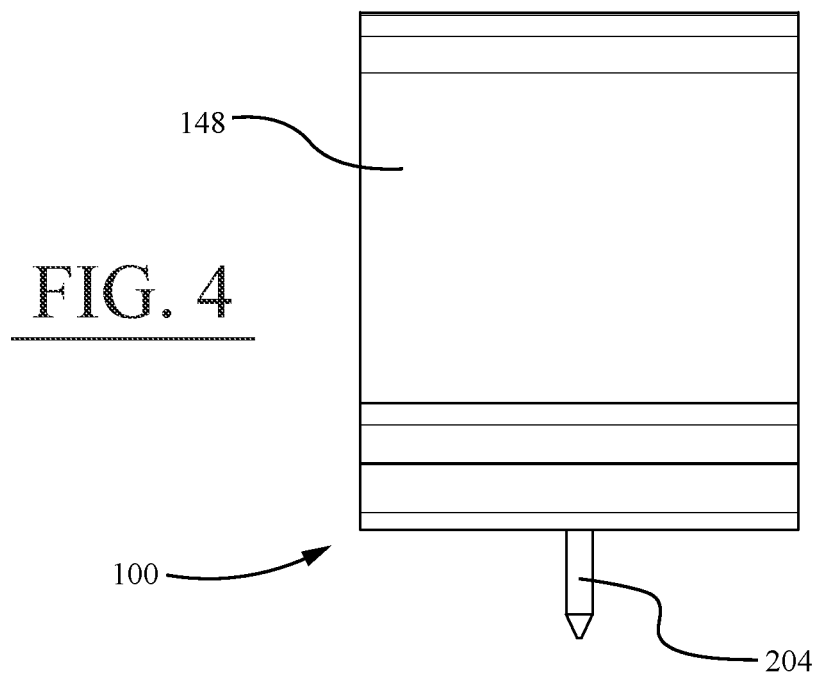
FIG. 4 is a rear elevation view of the version shown in FIG. 1.
Figure 5:
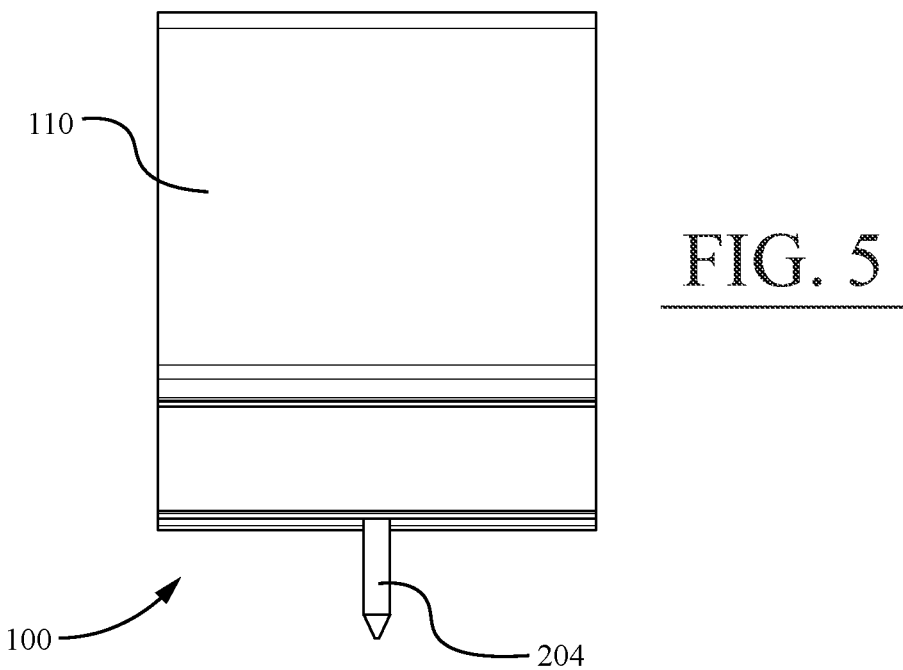
FIG. 5 is a front elevation view of the version shown in FIG. 1.
Figure 9:
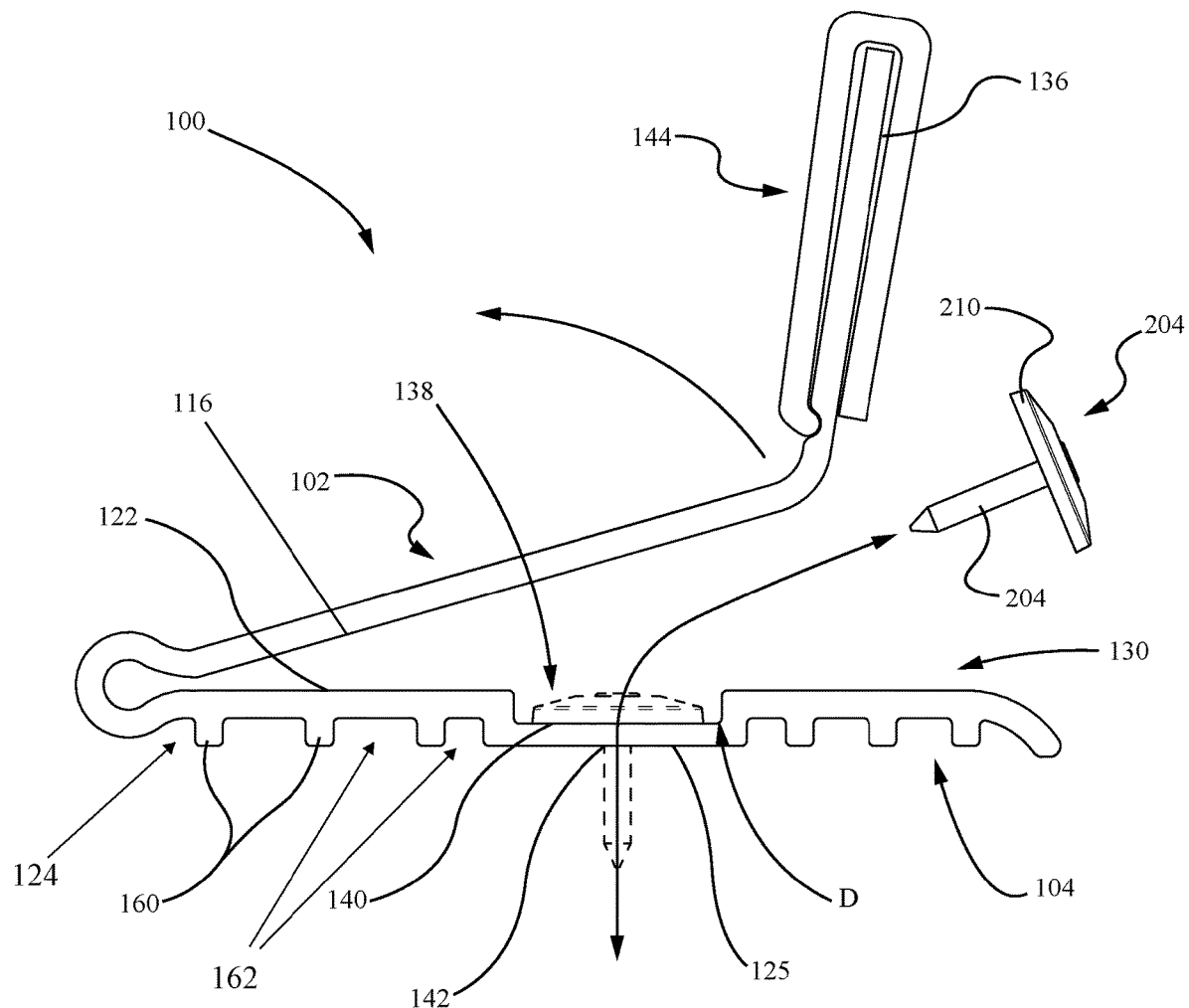
FIG. 9 is an illustrative right-side view of the version shown in shown in FIG. 1 showing positioning of a nail.
Figure 10:
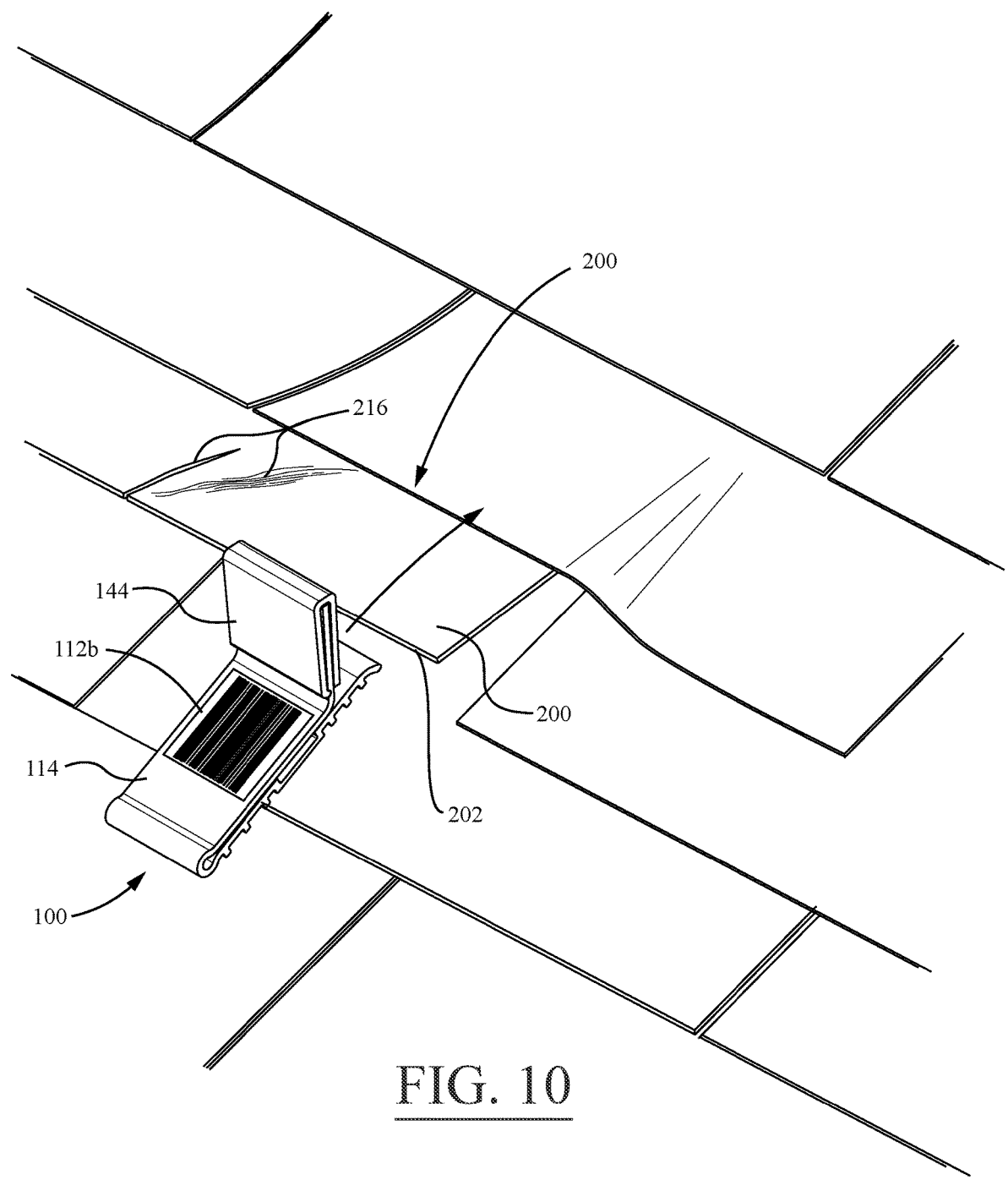
FIG. 10 is an illustrative perspective view of the version shown in FIG. 1 showing alignment and positioning of the identification clip onto a roof shingle.
Figure 11:
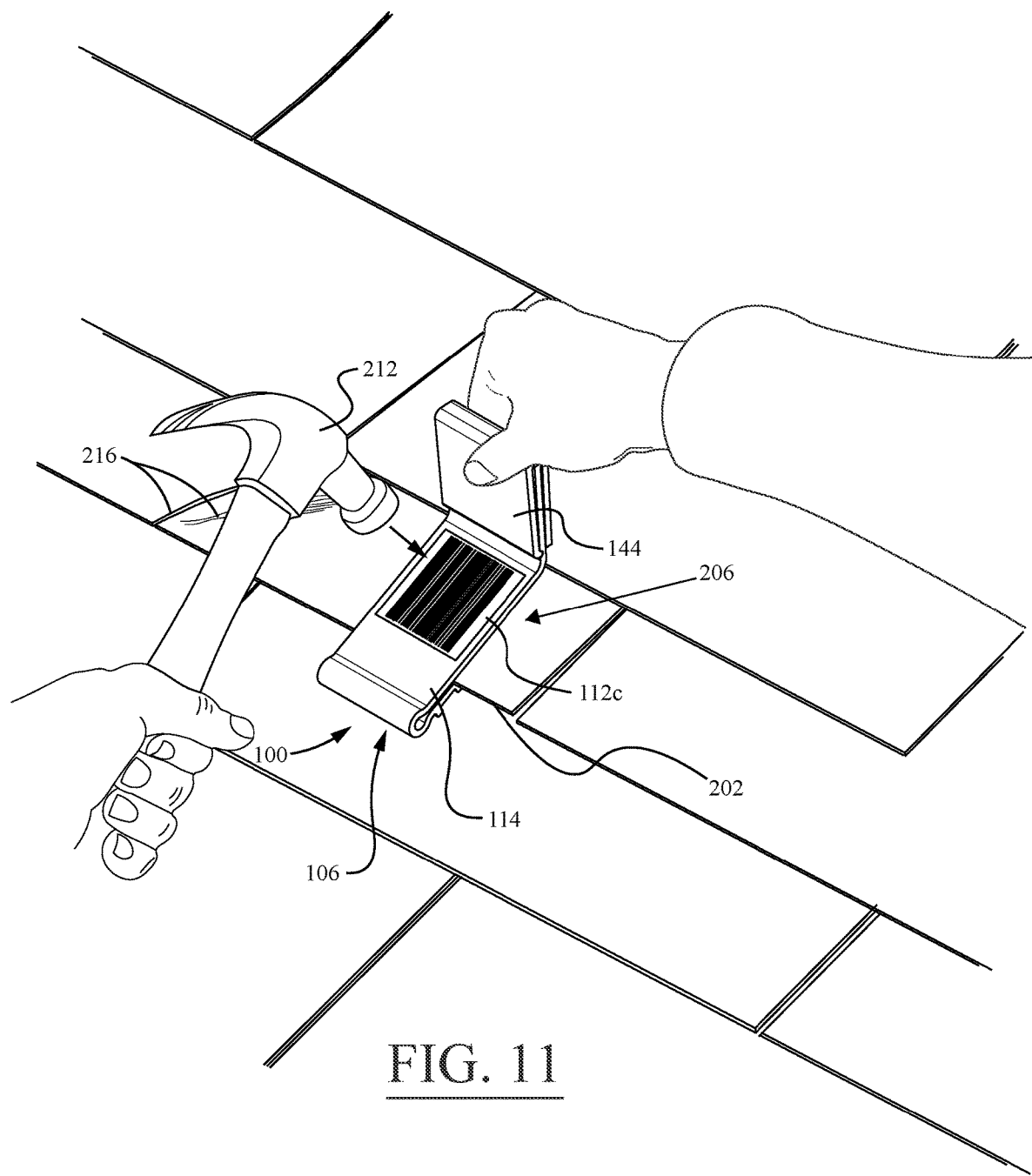
FIG. 11 is an illustrative perspective view of the version shown in FIG. 1 showing the identification clip attached to a roof shingle.

Initially with reference to FIG. 1-FIG. 11, a description of a first version of the invention will be provided. In particular, FIG. 1 is a front perspective view showing a version of the roof shingle identification clip 100. The shingle identification clip 100 is operably configured to be selectively attached to one or more roof shingles in order to flag and identify defective shingles 200 as illustrated in FIG. 10-FIG. 11. One or more dentification clips 100 can be collectively used to visually illustrate and easily ascertain the quality and quantity of roof damage as viewed from afar, such as from the ground or by air.

In certain versions of the application and as best shown in FIG. 1 and FIG. 6, the identification clip 100 for visually marking one or more damaged shingles 200 generally comprises an upper platform 102, a lower platform 104, a biasing member 106, and tab member 108 which provides a front face 110 (FIG. 8) for displaying a visual identifier 112a, preferably viewable from the perspective of a person standing on the ground.

Generally, one or more visual identifiers 112a-112c can be positioned on surfaces of the identification clip 100 which can be best viewed from afar. Visual identifiers 112 can be any predetermined sign or indicator which correlates information about the quality, location, and/or characteristics of the relating attached shingle 200. For example, various colors, patterns, machine readable bar codes, symbols, etc. or a combination thereof can be utilized to designate different information and data about each shingle 200.

In the illustrated version, the upper platform 102 includes a top surface 114, bottom engagement surface 116, forward end 118, and a rear end 120. The upper platform 102 has a planar rectangular body which extends a length $L_U$ (FIG. 7) between the forward end 118 and the rear end 120 along an upper platform longitudinal axis. Optionally, the top surface 114 may also be configured to display a visual identifier 112*b* (FIG. 10) which is viewable from above which will be discussed in detail below. The bottom engagement surface 116 is configured to adapt to and adhere to the bottom underside surface 231 of a shingle 200 while the roof shingle identification clip 100 is attached thereto. The bottom engagement surface 116 may be a singular continuous surface or the combination of two or more surfaces.

As best shown in FIG. 1-FIG. 6, the lower platform 104 generally includes a top engagement surface 122, a bottom surface 124, forward end 126 and a rear end 128. The lower platform 104 having a generally planar rectangular body which extends a length $L_L$ (FIG. 6) between the forward end 126 and the rear end 128 along a lower platform longitudinal axis X. The top engagement surface 122 is configured to adapt to and adhere to the top surface 230 of a shingle 200 while the roof shingle identification clip 100 is attached thereto. The top engagement surface 122 may be a singular continuous surface or the combination of two or more surfaces. Further, the rear end 128 of the lower platform 104 may further include an integral flange 129 extending downward at an angle for providing support. In certain versions of the application, preferably, the lower platform 104 longitudinal length $L_L$ is equal to or less than the upper platform 102 longitudinal length $L_U$.

The biasing member 106 operably connects the forward end 118 of the upper platform 102 and the forward end 126 of the lower platform 104, wherein the biasing member 106 urges the upper platform 102 and the lower platform 104 towards the other and forms a narrow column 130 therebetween adapted to receive and grip a segment of a shingle 200 therein. In the illustrated version, the biasing member 106 comprises a curved portion having a semi-circular cross section.

As best shown in FIG. 8, the tab member 108 generally extends upward at an angle from the rear end 120 of the upper platform 102 along a tab member 108 longitudinal axis R terminating at an upper edge 134. The tab member 108 generally includes a planar body having a base 132 which integrally forms a joint 121 with the rear end 120 of the upper platform 102. The tab member 108 having a rear surface 136 and a front face 110 which is adapted to display the visual identifier 112 viewable from the perspective of a person standing on the ground. Preferably, the angle t formed between the lower platform 104 longitudinal axis X and the tab member 108 longitudinal axis R is between 80-180 degrees, most preferably about 105 degrees. The desired angle t may be adjustable in order to better display the visual identifier depending on the pitch of the roof and the viewing distance. Thus, the tab member 108 may be configured to flexibly move forward or rearward relevant to the upper platform 102 in order to adjust the angle t by providing flexible characteristics at the joint 121.

In a version of the invention and as best illustrated by FIG. 9, the lower platform 104 further includes a recessed channel or recessed portion 138 positioned at a midpoint along the length $L_L$ of the body of the lower platform 104. The recessed portion 138 positioned between a discontinuity of the lower platform 104 top engagement surface 122 and having a depth D. The recessed portion 138 includes an embedded flat upward facing surface 140 positioned at a depth below the lower platform 104 top engagement surface 122 and having a central nail hole or passage 142 extending through the body of the lower platform 104 and exiting at the bottom flat surface 125. The bottom flat surface 125 is adapted to seat flush with the top surface 230 of the plywood deck 208 (See FIG. 12 and FIG. 13). The recessed portion 138 is operably configured to receive and support a nail 204 in order to affix the identification clip 100 to a roof shingle 200. Preferably, the recessed portion 138 is dimension to fit and receive an umbrella type roofing nail 204 or a nail including a washer. The recessed portion 138 configuration allows the identification clip 100 to be attached without causing damage to the shingle 200 or surrounding shingles.

In a version of the application and as best shown in FIG. 9, the bottom surface 124 of the lower platform 104 may include a plurality of embedded laterally extending ribs 160 forming channels 162 therebetween. Thus, providing a superior grip while the identification clip 100 is attached to a roofing shingle 200 and providing depth to the lower platform 104.

Referring now to FIG. 8, a version of the application may further include a detachable member 144 designed to attach to the tab member 108. The detachable member 144 generally has a front panel 146, a rear panel 148, and a top end 150 fixedly attaching each panel forming an overall U-shaped providing an insertion slot 152. Generally, the detachable member 144 slot 152 is adapted to receive and seat the overall profile of the tab member 108, thereby securely attaching thereto.

Figure 14:
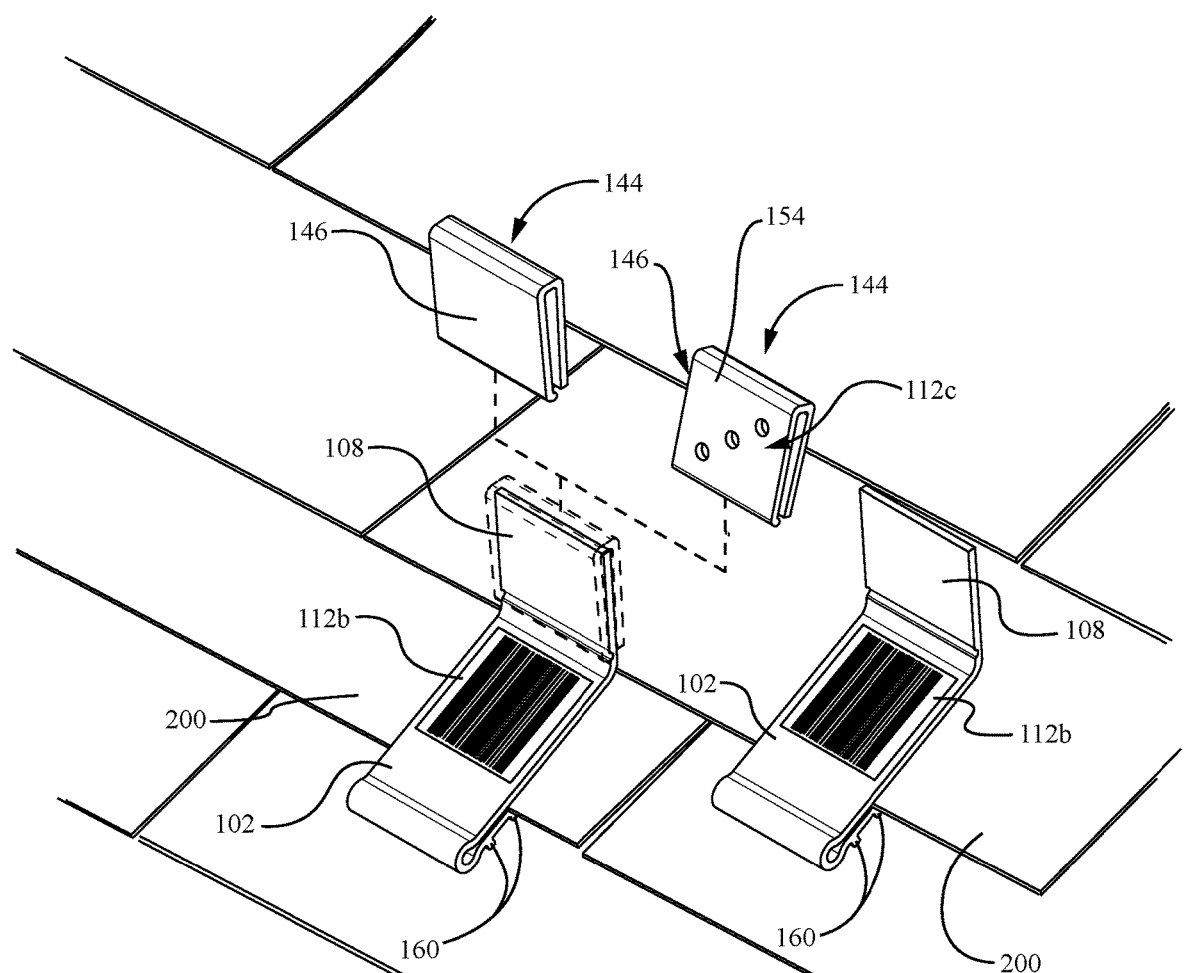
FIG. 14 is an illustrative view showing use of a plurality of identification clips used in combination with a plurality of detachable members.

Referring to FIG. 14, the front panel 146 includes a front face 154 which is configured for displaying a visual identifier 112*c*. Thus, permitting the user the ability to select from a plurality of detachable members 144 which display different visual identifiers 112 correlating information about the quality, location, and characteristics of each identified shingle 200. This allows the user to change the visual identifier 112*c* without removing the identification clip 100 while already affixed to a roofing shingle 200 which will be described in further detail below.

In certain versions of the application, the tab member 108 near the base 132 comprises a laterally extending channel 156, and the detachable member 144 further includes a reciprocally shaped inward projecting lip 158 extending below the front face 154. The inward projecting lip 158 is operably configured to seat via a friction type fit with the laterally extending channel 156 while the detachable member 144 is attached to the tab member 108. This type of configuration allows the detachable member 144 to easily be attached to the tab member 108 by laterally sliding thereon.

Now referring to FIG. 8-FIG. 17, the purpose and operation of the identification clip 100 will be described in more detail. Generally, the purpose of the identification clip 100 is to provide one or more clips 100 which are attachable to one more roof shingles 200 which have been designated as damaged or needing to be replaced by a roofing professional. Ideally, the identification clips 100 are clearly visible from the perspective or point of view 222 of a person 220 standing on the ground 221 (FIG. 17). Because the identification clips 100 are visible from the ground and as best shown in FIG. 17, a roofing professional or roof inspector, such as an insurance adjuster can easily and visually ascertain the quality and quantity the roof damage from a ground perspective.

Figure 12:
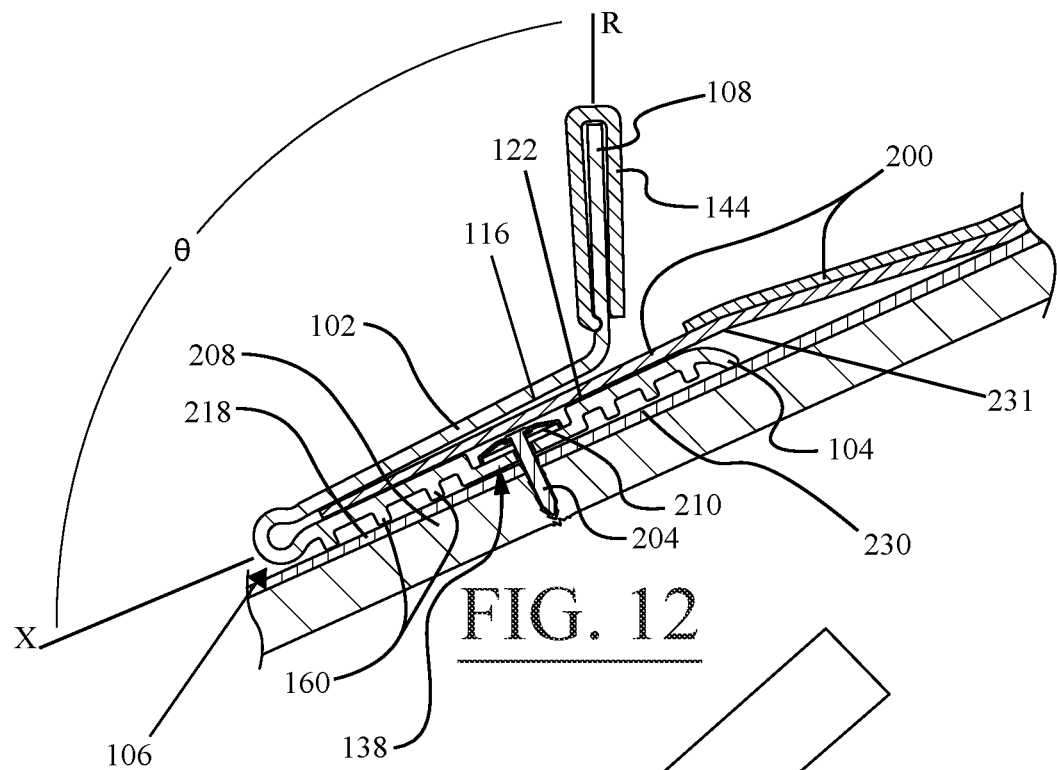
FIG. 12 is a cross-sectional view of the version shown in FIG. 1 while attached to a roof shingle.

With reference to FIG. 9, each identification clip 100 is prepped before attachment by positioning an umbrella roofing nail 204 through the central nail hole or passage 142 of the recessed portion 138. Thereafter, referring to FIG. 10, the identification clip 100 is attached to a roof shingle 200 by first positioning it forward and parallel with the selected shingle 200—aligning the front edge 202 with the narrow column 130. As shown in FIG. 11 and FIG. 12, the identification clip 100 is translated forward—positioning a forward segment 206 extending from the front edge 202 of the roof shingle 200 securely within the narrow column 130. The biasing member 106 acting to clamp the roof shingle 200 between the upper platform 102 bottom engagement surface 116 and the lower platform 104 top engagement surface 122. The biases bottom engagement surface 116 and the top engagement surface or surfaces act to provide a friction type fit, wedging the shingle segment 206 therebetween.

Referring to FIG. 11 and FIG. 12, the identification clip 100 is affixed to the roof shingle 200 by driving the nail 204 into the plywood 208 below by striking the top surface 114 of the upper platform 102, thereby translating force into the shingle 200 body seated within the narrow column 130 and then to the head and umbrella portion 210 of the nail 204. Thereby driving the nail 204 down through the central nail hole or passage 142 and securely attaching the identification clip 100 to the shingle 200 while concurrently mitigating further damage to the shingle 200. The head of the nail 204 and associated washer or umbrella 210 are positioned neatly in the recessed channel 138—the top umbrella portion 210 seated flush or below the top engagement surface 122 of the lower platform 104.

Figure 13:
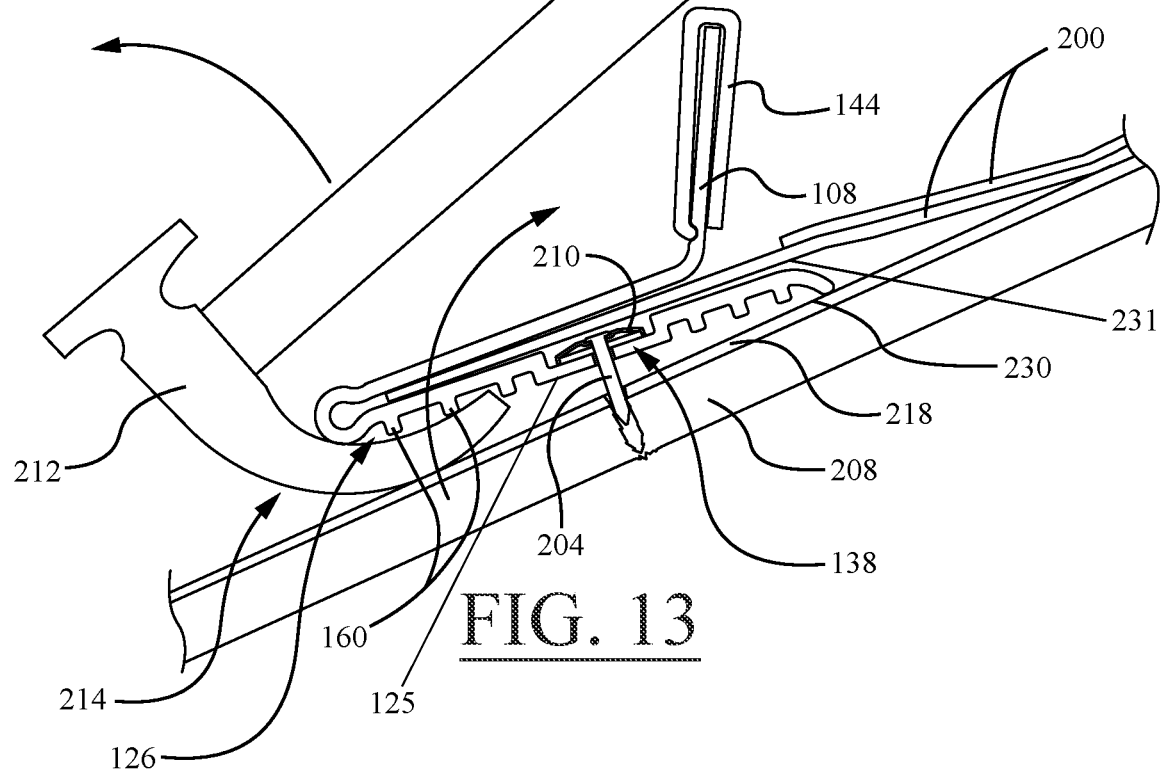
FIG. 13 is an illustrative side view of the version shown in FIG. 1 being removed from a roof shingle.

With reference to FIG. 13, the identification clip 100 can easily be removed by utilizing the claw 214 of a hammer 212. The claw 214 is wedged between the forward end 126 of the lower platform 104 and the plywood 208 and pried rearward, thereby lifting the nail 204 free of the plywood 208. The identification clip 100 is then translated rearward—removing the segment 206 of roof shingle 200 from the narrow column 130 freeing the identification clip 100.

FIG. 14 is an illustrative perspective showing use of a plurality of detachable members 144 providing optional visual identifiers 112c. Thus, different visual identifiers 112c may be utilized to designate the status of the shingle 200. For example, the color of the visual identifier 112c may designate degree of the damage with regard to each shingle 200. Visual identifiers 112c can be any visual indicator that designates information about the requisite shingle, such as colors, patterns, bar codes, symbols, etc. or a combination thereof.

Figure 15:
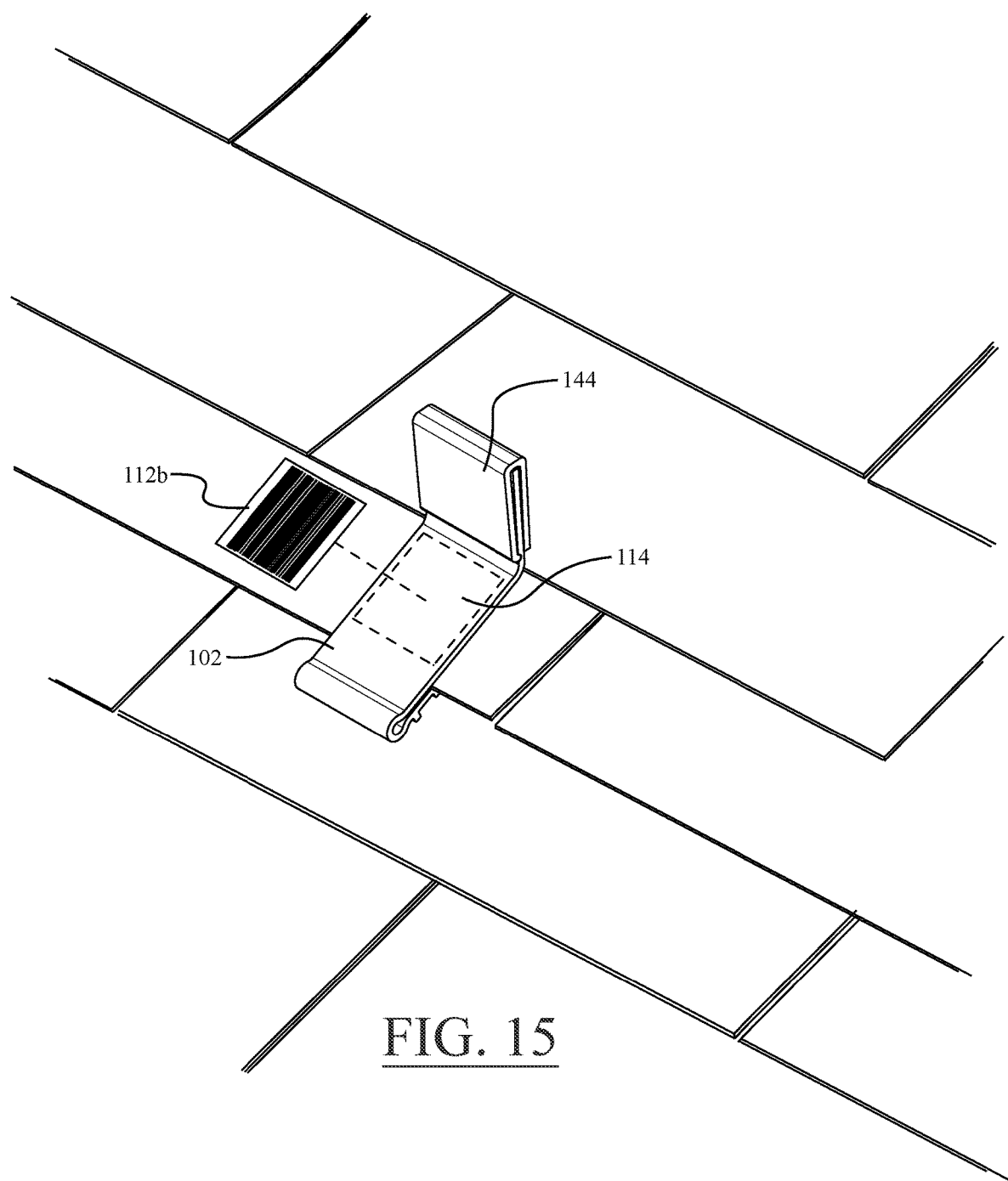
FIG. 15 is an illustrative perspective view showing application of the visual identifier as it correlates with the upper platform top surface.
Figure 16:
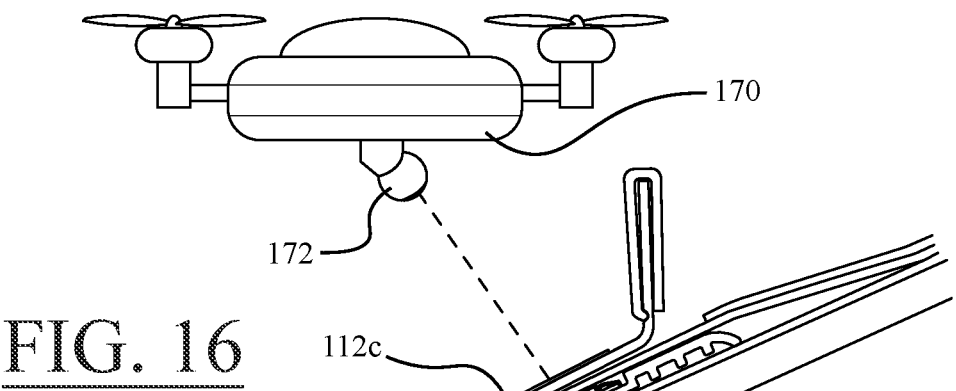
FIG. 16 is an illustrative perspective view showing the additional use of one or more drones to scan and identify a plurality of identification clips.
Figure 17:
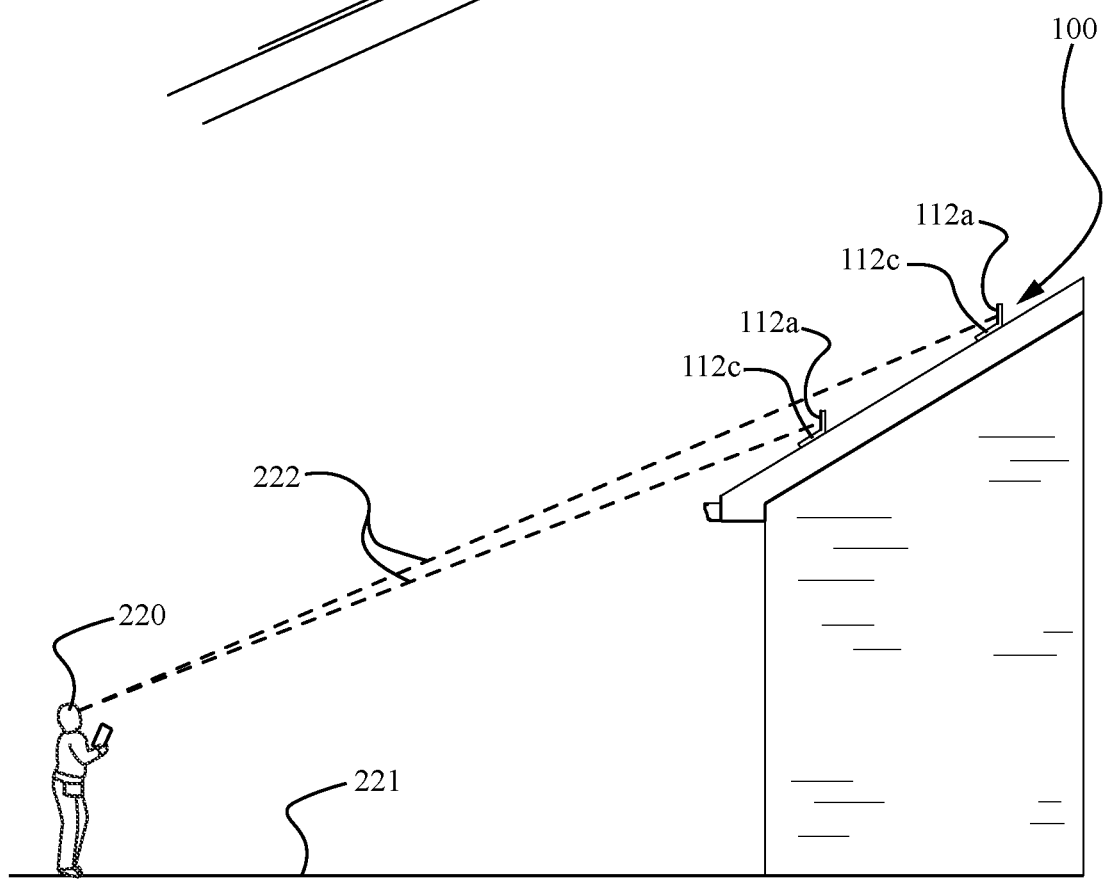
FIG. 17 is an illustrative view showing the line of sight view of a plurality of identification clips from the ground.

With reference to FIG. 15 and FIG. 16, in certain version of the application, the top surface 114 of the upper platform 102 can be utilized to display one or more visual identifiers 112b which are visible from the air. In certain versions, a system can be utilized which includes one or more UAV or drones 170 which are operably configured to approach, scan, store, and upload information relating to each identification clip 100. For example, the UAV 170 may utilize on-board optics 172 to scan the visual identifier 112b or machine readable bar code relating to each identification clip 100—identifying the clip 100 and relaying formation regarding status of shingle 200 such as degree of damage, position, etc. Thereafter, the information can be compiled by a computer system to display graphs, matrices, diagrams, and reports for review by a roofing professional. For example, graphical information such as the degree of damage of each shingle or a group of shingles can be displayed. Further, a graphical representation or matrix of affected shingles could be displayed for visual reference comparative to the entirety of the roof.

The identification clip 100 can be made in any manner and of any material chosen with sound engineering judgment. Preferably, materials will be strong, lightweight, long lasting, economic, and ergonomic. In certain versions, the identification clip can be manufactured as a unitary and continuous unit—such as by way of a vacuum forming process or an injection mold.

Figure 18:
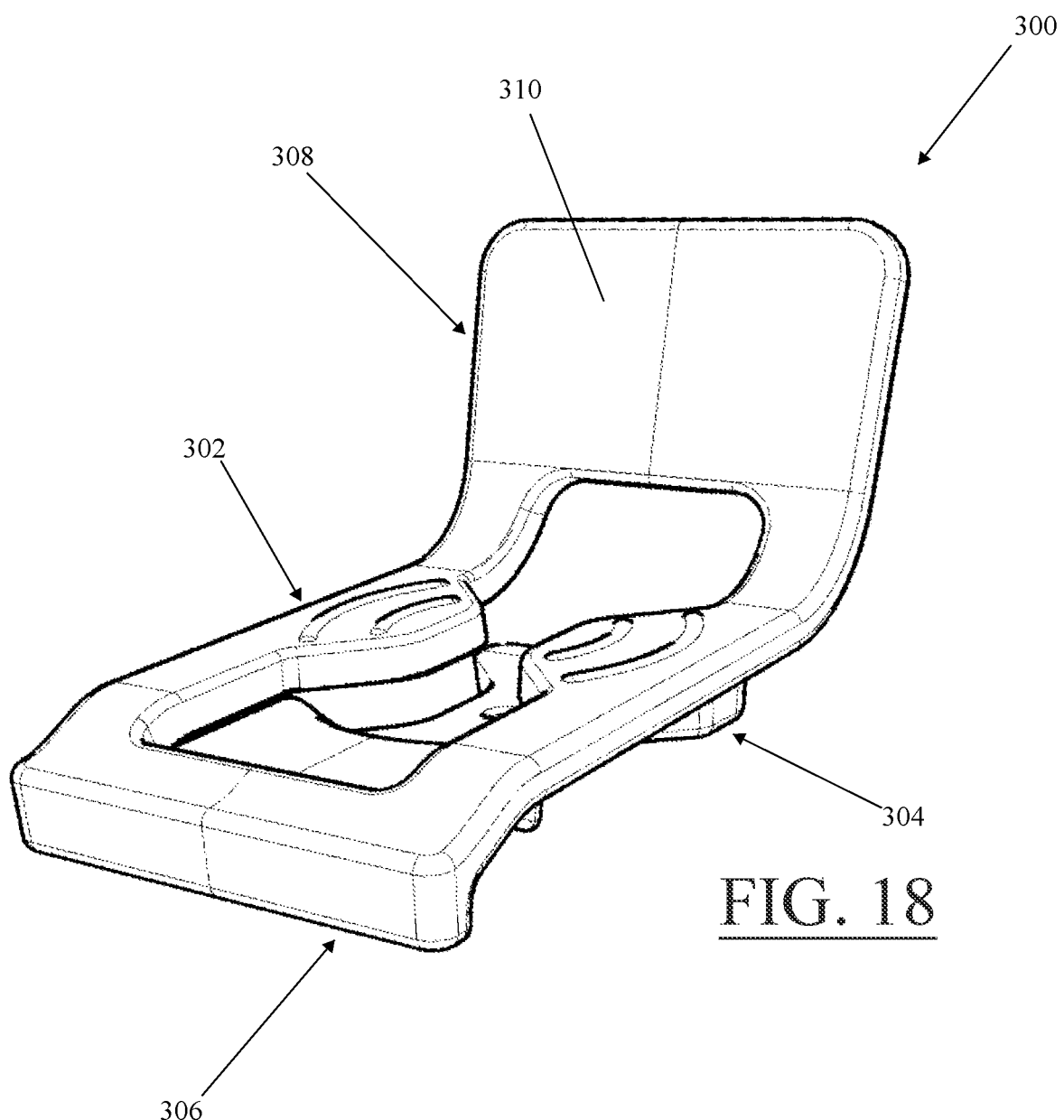
FIG. 18 is a front, right side perspective view of a second version of the application.
Figure 19:
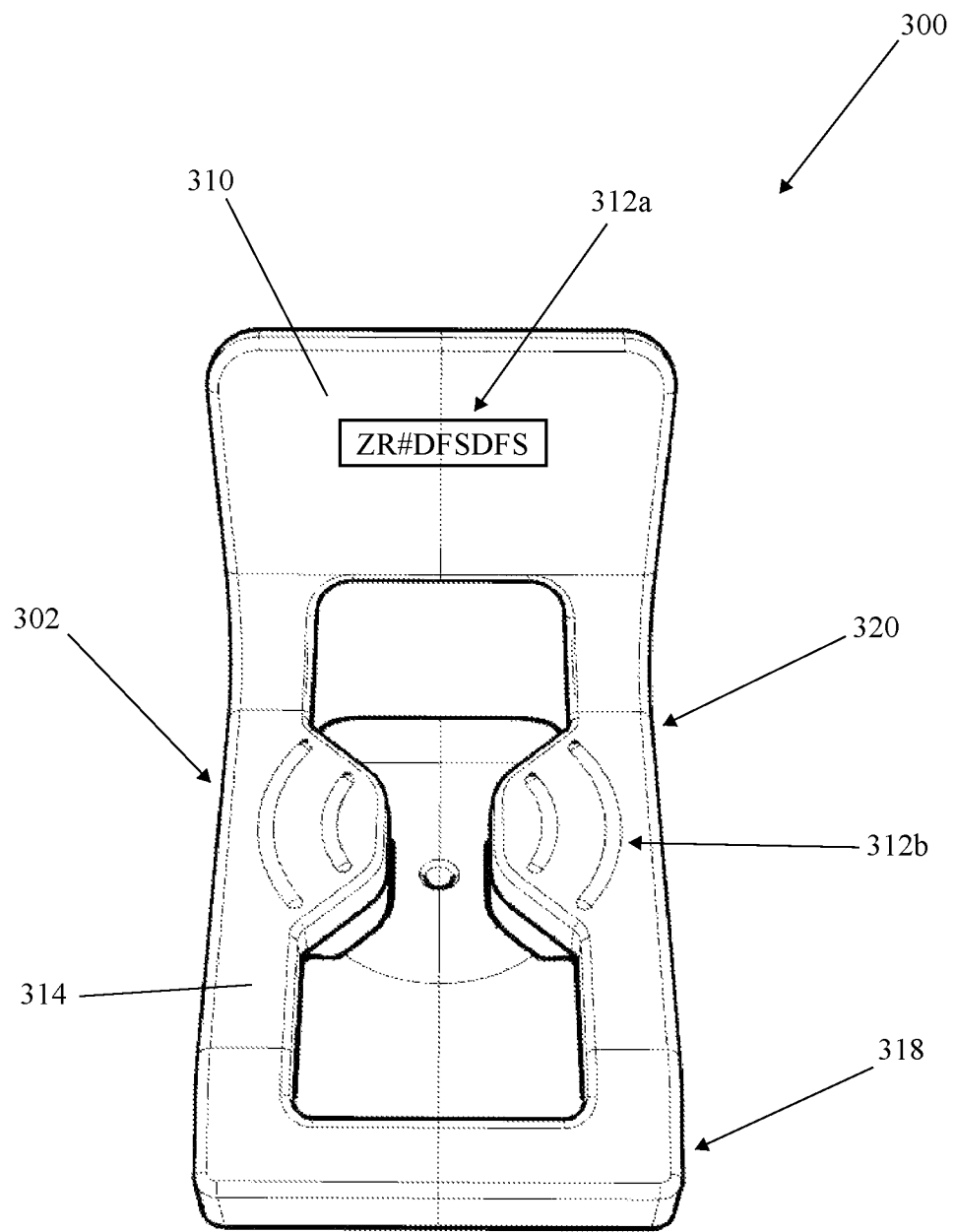
FIG. 19 is a front perspective view of the version shown in FIG. 18.
Figure 20:
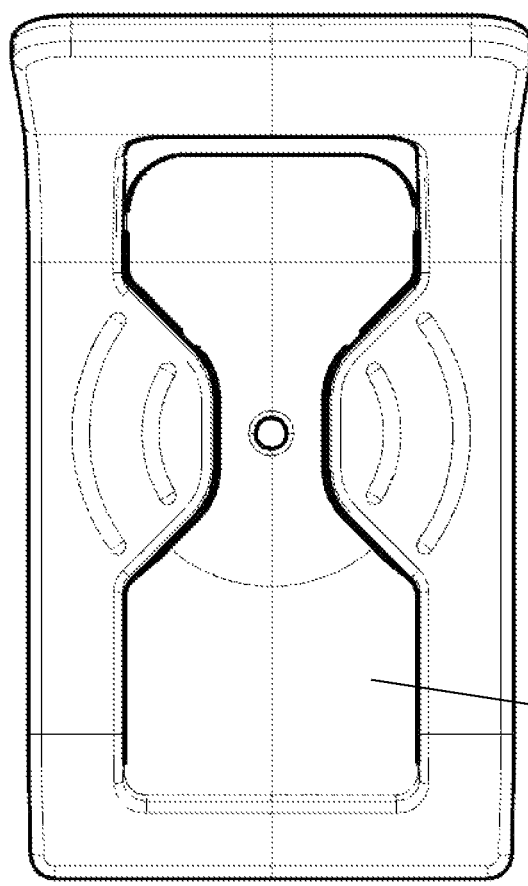
FIG. 20 is a top plan view of the version shown in FIG. 18.
Figure 21:
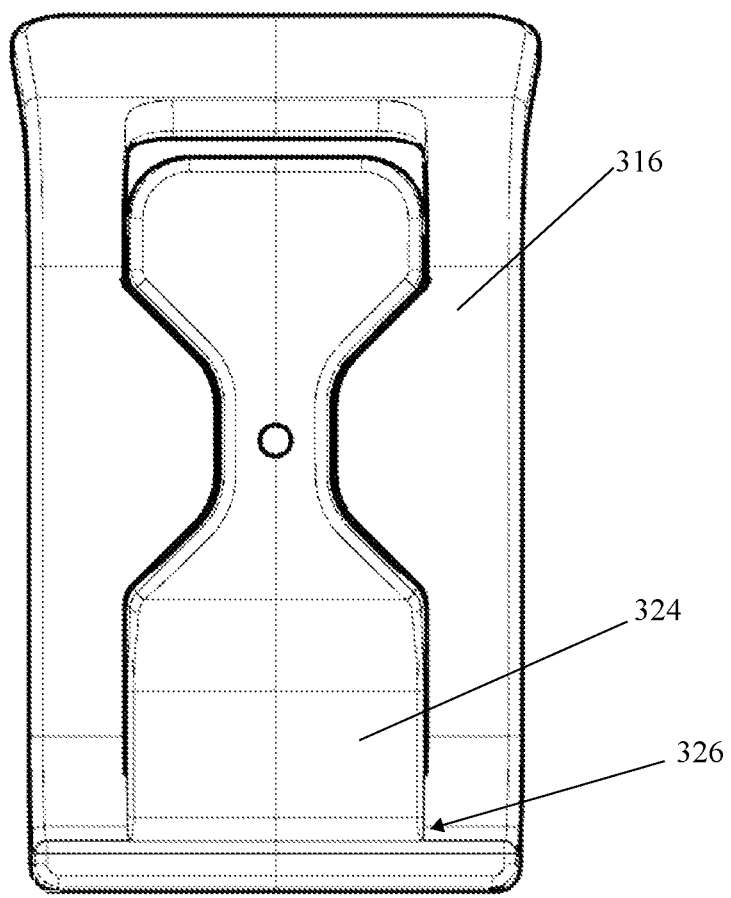
FIG. 21 is a bottom plan view of the version shown in FIG. 18.
Figure 22:
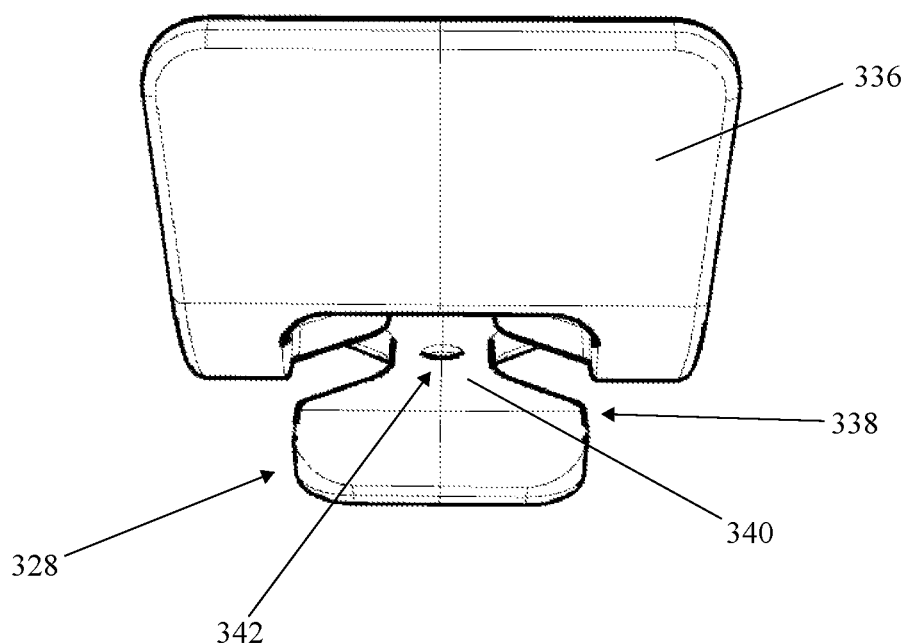
FIG. 22 is a rear perspective view of the version shown in FIG. 18.
Figure 23:
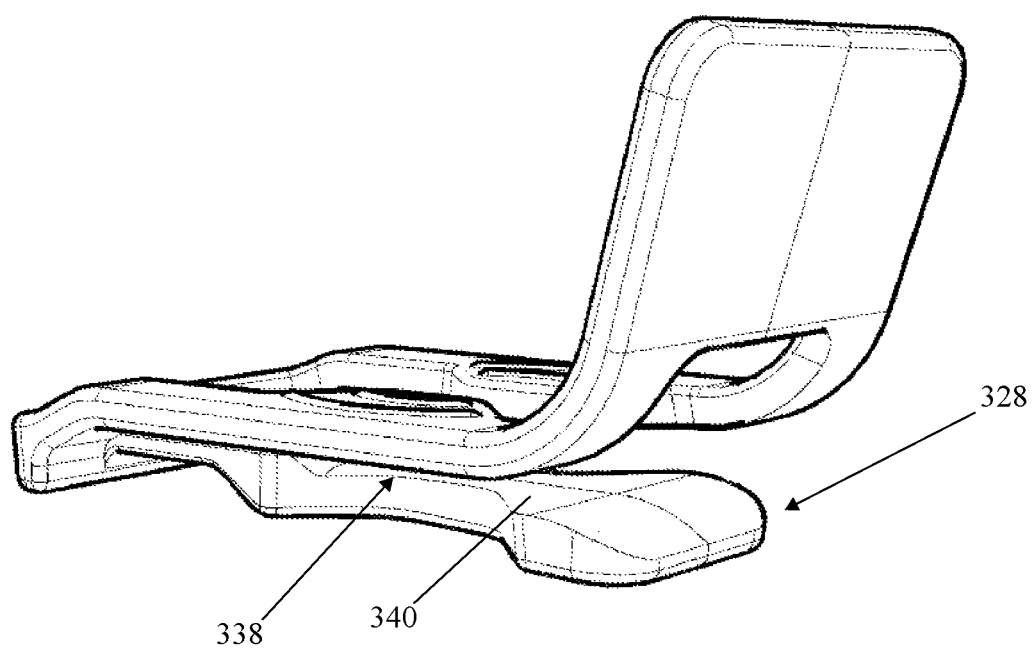
FIG. 23 is a right-side rear perspective view of the version shown in FIG. 18.
Figure 24:
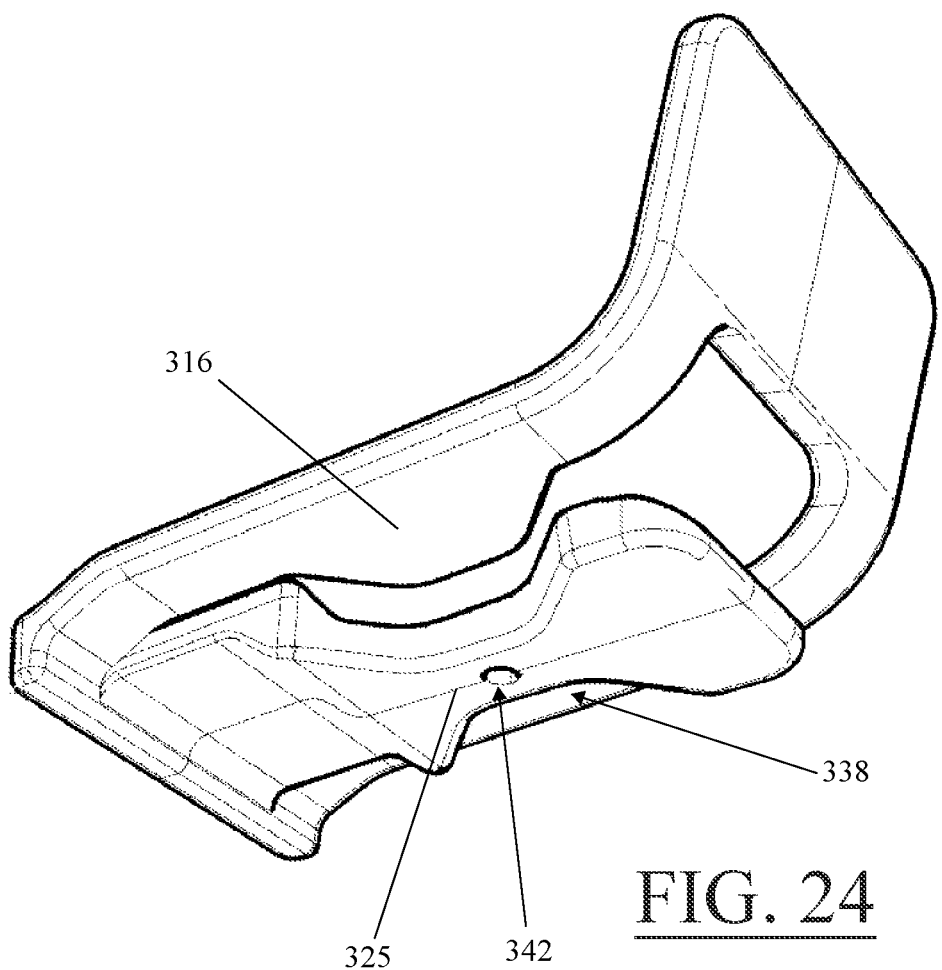
FIG. 24 is a bottom side rear perspective view of the version shown in FIG. 18.
Figure 25:
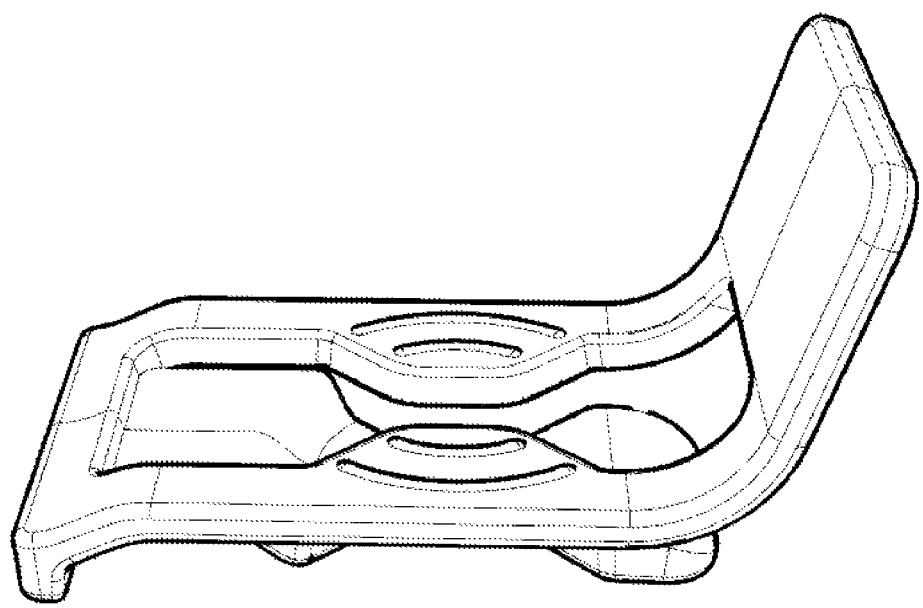
FIG. 25 is a right-side perspective view of the version shown in FIG. 18.

With reference to FIG. 18-FIG. 26, a description of a second version of the invention will be described in detail. In particular, FIG. 18 is a front perspective view showing a version of the roof shingle identification clip 300. The shingle identification clip 300 is operably configured to be selectively attached to one or more roof shingles in order to flag and identify defective shingles 200. One or more dentification clips 300 can be collectively used to visually illustrate and easily ascertain the quality and quantity of roof damage as viewed from afar, such as from the ground or by air.

In certain versions of the application and as best shown in FIG. 1 and FIG. 6, the identification clip 300 for visually marking one or more damaged shingles 200 generally comprises an upper platform 302, a lower platform 304, a biasing member 306, and tab member 308 which provides a front face 310 for displaying a visual identifier, preferably viewable from the perspective of a person standing on the ground.

Generally, one or more visual identifiers 312 (FIG. 19) can be positioned on surfaces of the identification clip 300 which can be best viewed from afar. Visual identifiers 312 can be any predetermined sign or indicator which correlates information about the quality, location, and/or characteristics of the relating attached shingle 200. For example, various colors, patterns, machine readable bar codes, symbols, letters, numbers, etc. or a combination thereof can be utilized to designate different information and data about each shingle 200.

In the illustrated version, the upper platform 302 includes a top surface 314, bottom engagement surface 316 (FIG. 21), forward end 318, and a rear end 320. The upper platform 302 has a planar rectangular body which extends a length between the forward end 318 and the rear end 320 along an upper platform longitudinal axis. Optionally, the top surface 314 may also be configured to display a visual identifier 312b (FIG. 19) which is viewable from above. The bottom engagement surface 316 (FIG. 26) is configured to adapt to and adhere to the bottom underside surface 231 of a shingle 200 while the roof shingle identification clip 300 is attached thereto. The bottom engagement surface 316 may be a singular continuous surface or the combination of two or more surfaces.

As best shown in FIG. 22-FIG. 26, the lower platform 304 generally includes a top engagement surface 322, a bottom surface 324, forward end 326 and a rear end 328. The lower platform 304 having a generally planar rectangular body which extends a length $L_L$ (FIG. 26) between the forward end 326 and the rear end 328 along a lower platform longitudinal axis X. The top engagement surface 322 is configured to adapt to and adhere to the top surface 230 of a shingle 200 while the roof shingle identification clip 300 is attached thereto. The top engagement surface 322 may be a singular continuous surface or the combination of two or more surfaces. Further, the rear end 328 of the lower platform 304 may further include an angled wedge portion 329 extending downward at an angle for penetrating beneath a shingle.

The biasing member 306 operably connects the forward end 318 of the upper platform 302 and the forward end 326 of the lower platform 304, wherein the biasing member 306 positions the upper platform 302 and the lower platform 304 in a parallel manner. The biasing member 306 further functions to resisting movement between the upper platform 302 and the lower platform 304, particularly movement away from each other such as in the presence of a shingle positioned therebetween. The upper platform 302 and the lower platform 304 form a narrow column 330 therebetween adapted to receive and grip a segment of a shingle 200 therein. In the illustrated version, the biasing member 306 comprises a joint portion preferably manufactured of strong plastic or composite material allowing moderate flexing at the joint.

Figure 26:
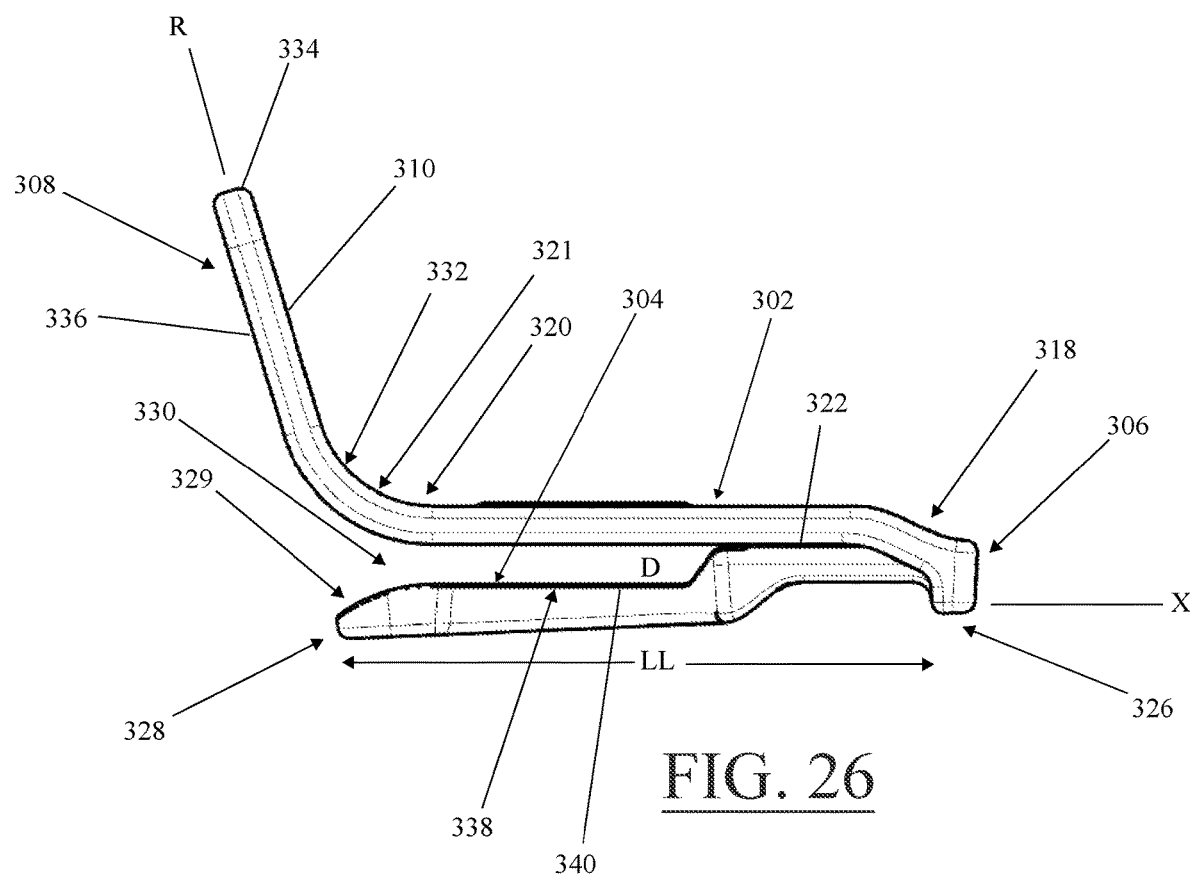
FIG. 26 is a left-side elevation view of the version shown in FIG. 18.

As best shown in FIG. 26, the tab member 308 generally extends upward at an angle from the rear end 320 of the upper platform 302 along a tab member 308 longitudinal axis R terminating at an upper edge 334. The tab member 308 generally includes a planar body having a base 332 which integrally forms a joint 321 with the rear end 320 of the upper platform 302. The tab member 308 having a rear surface 336 and a front face 310 which is adapted to display the visual identifier 312 viewable from the perspective of a person standing on the ground. Preferably, the angle t formed between the lower platform 304 longitudinal axis X and the tab member 308 longitudinal axis R is between 80-180 degrees, most preferably about 105 degrees. The desired angle t may be adjustable in order to better display the visual identifier depending on the pitch of the roof and the viewing distance. Thus, the tab member 308 may be configured to flexibly move forward or rearward relevant to the upper platform 302 in order to adjust the angle t by providing flexible characteristics at the joint 321.

In a version of the invention and as best illustrated by FIG. 9, the lower platform 304 further includes a recessed portion 338 positioned at a midpoint along the length $L_L$ of the body of the lower platform 304. The recessed portion 338 aft of the top engagement surface 322 of the lower platform 304 and having a depth D. The recessed portion 338 includes an embedded flat upward facing surface 340 positioned at a depth below the lower platform 304 top engagement surface 322 and having a central nail passage or hole 342 extending through the body of the lower platform 304 and exiting at the bottom flat surface 325. The bottom flat surface 325 is adapted to seat flush with the top surface 230 of the plywood deck 208 (See FIG. 12 and FIG. 13). The recessed portion 338 is operably configured to receive and support a nail 204 in order to affix the identification clip 300 to a roof shingle 200. Preferably, the recessed portion 338 is dimension to fit and receive an umbrella type roofing nail 204 or a nail including a washer. The recessed portion 338 configuration allows the identification clip 300 to be attached without causing damage to the shingle 200 or surrounding shingles.

Figure 27:
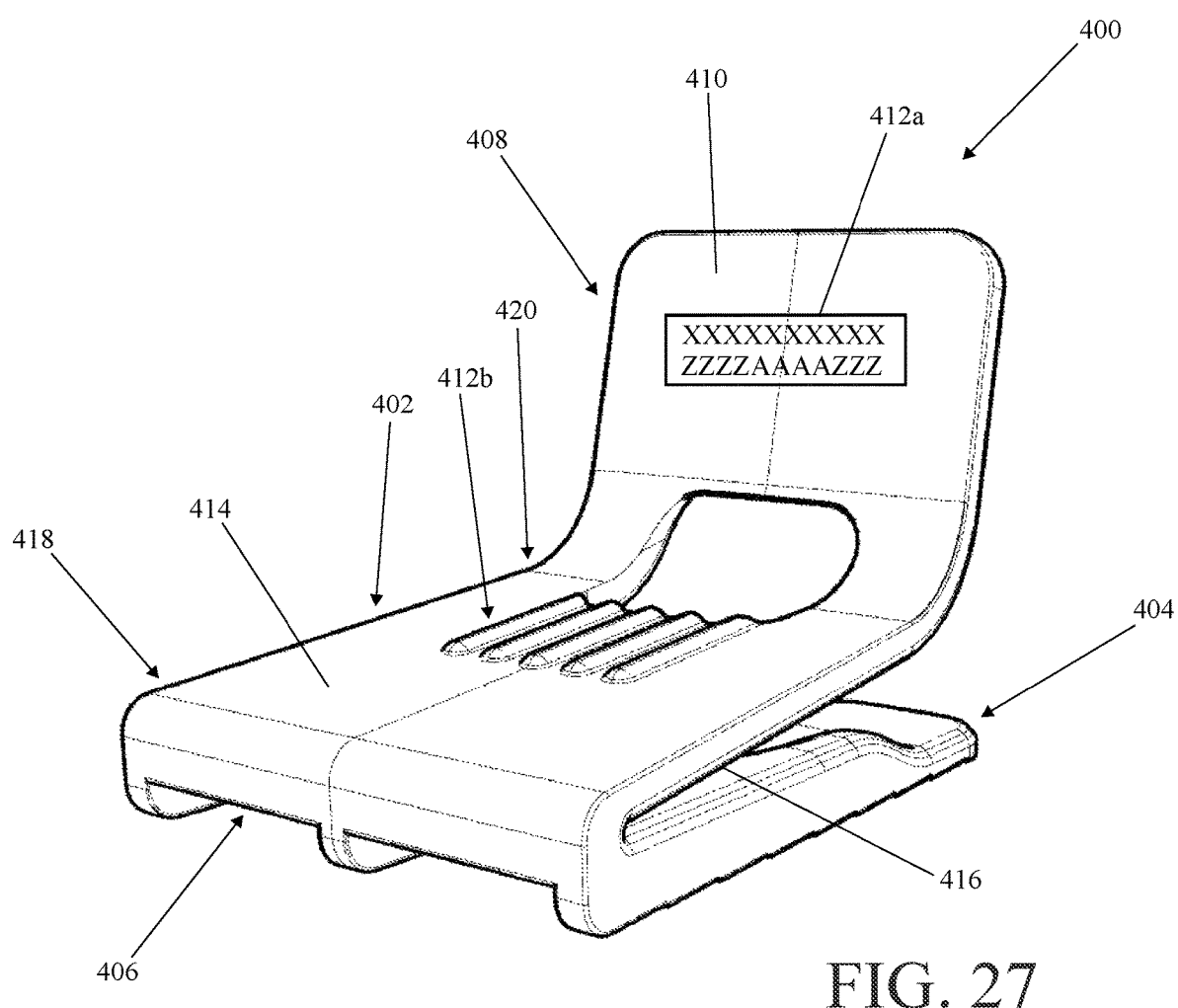
FIG. 27 is a front, right-side perspective view of a third version of the application.
Figure 28:
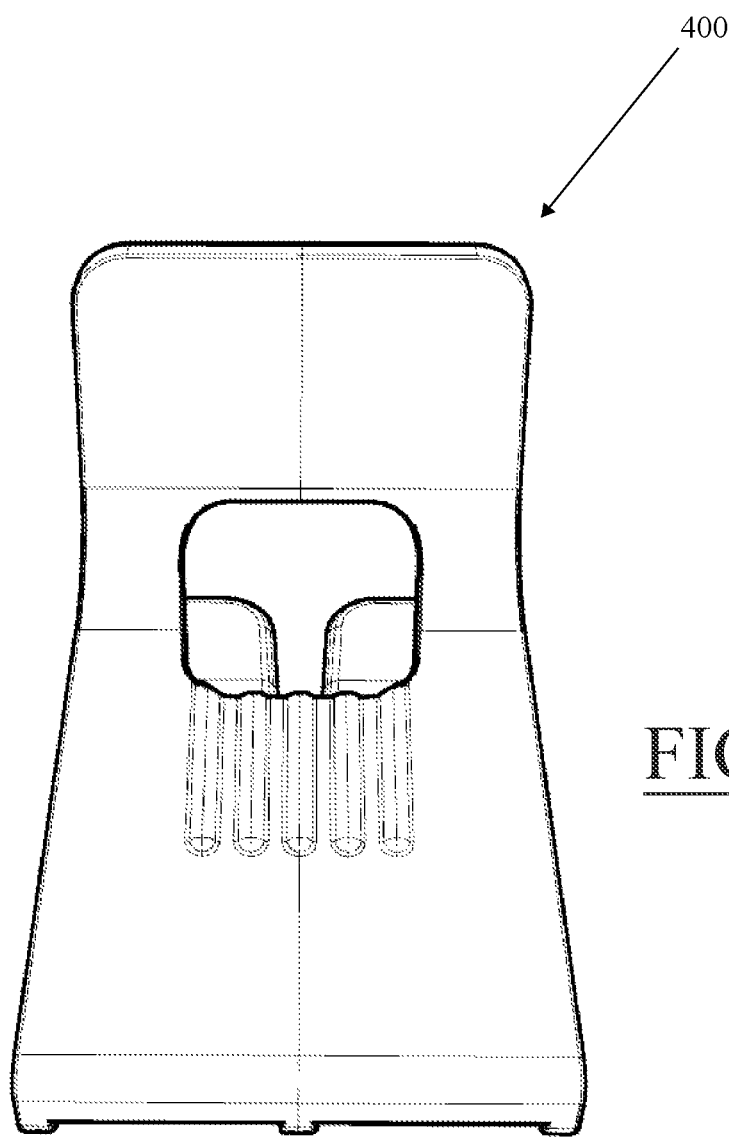
FIG. 28 is a front perspective view of the version shown in FIG. 27.
Figure 29:
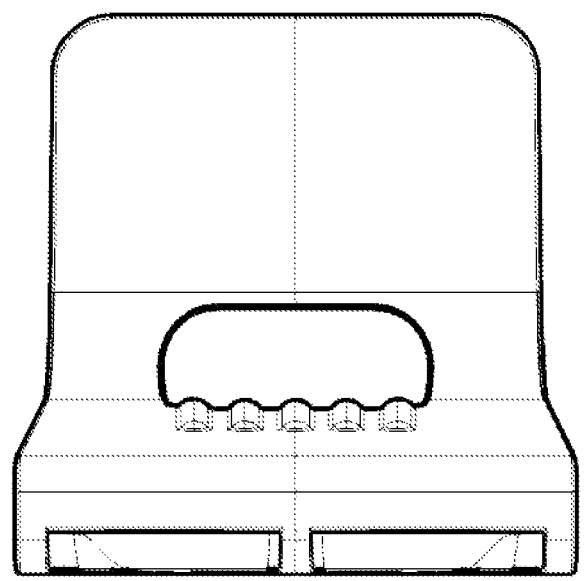
FIG. 29 is a front elevation view of the version shown in FIG. 27.
Figure 30:
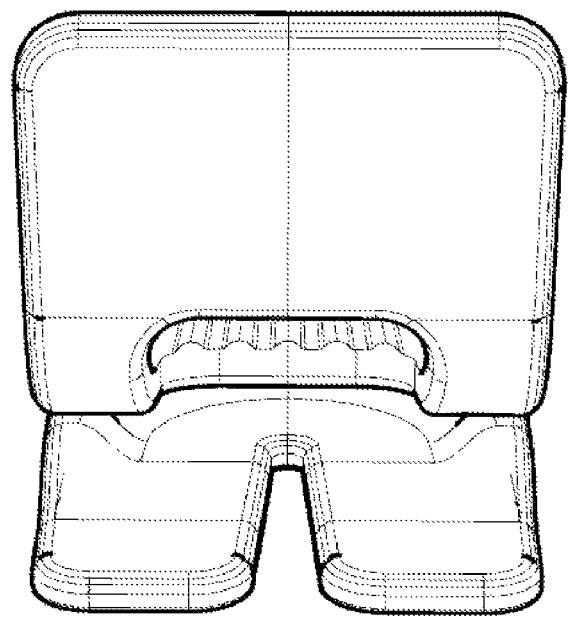
FIG. 30 is a rear perspective view of the version shown in FIG. 27.

With reference to FIG. 27-FIG. 36, a description of a third version of the invention will be described in detail. In particular, FIG. 27 is a front perspective view showing a version of the roof shingle identification clip 400. The shingle identification clip 400 is operably configured to be selectively attached to one or more roof shingles in order to flag and identify defective shingles 200 as illustrated in FIG. 10-FIG. 11. One or more dentification clips 400 can be collectively used to visually illustrate and easily ascertain the quality and quantity of roof damage as viewed from afar, such as from the ground or by air.

In certain versions of the application and as best shown in FIG. 27, the identification clip 400 for visually marking one or more damaged shingles 200 generally comprises an upper platform 402, a lower platform 404, a connecting or biasing member 406, and tab member 408 which provides a front face 410 for displaying a visual identifier 412a, preferably viewable from the perspective of a person standing on the ground.

Generally, one or more visual identifiers 412a-412b can be positioned on surfaces of the identification clip 400 which can be best viewed from afar. Visual identifiers 412 can be any predetermined sign or indicator which correlates information about the quality, location, and/or characteristics of the relating attached shingle 200. For example, various colors, patterns, letters, numbers, machine readable bar codes, symbols, etc. or a combination thereof can be utilized to designate different information and data about each shingle 200.

In the illustrated version, the upper platform 402 includes a top surface 414, bottom engagement surface 416, forward end 418, and a rear end 420. The upper platform 402 has a planar rectangular body which extends a length $L_U$ (FIG. 33) between the forward end 418 and the rear end 420 along an upper platform longitudinal axis. Optionally, the top surface 414 may also be configured to display a visual identifier 412b (FIG. 32) which is viewable from above which will be discussed in detail below. The bottom engagement surface 416 is configured to adapt to and adhere to the bottom underside surface 231 of a shingle 200 while the roof shingle identification clip 400 is attached thereto. The bottom engagement surface 416 may be a singular continuous surface or the combination of two or more surfaces.

As best shown in FIG. 31-FIG. 36, the lower platform 404 generally includes a top engagement surface 422, a bottom surface 424, forward end 426 and a rear end 428. The lower platform 404 having a generally planar rectangular body which extends a length $L_L$ (FIG. 35) between the forward end 426 and the rear end 428 along a lower platform longitudinal axis X. The top engagement surface 422 is configured to adapt to and adhere to the top surface 230 of a shingle 200 while the roof shingle identification clip 400 is attached thereto. The top engagement surface 422 may be a singular continuous surface or the combination of two or more surfaces. Further, the rear end 428 of the lower platform 404 may further include an wedge portion 429 extending downward and narrowing in depth in order to penetrate beneath a shingle and for providing support. In certain versions of the application, preferably, the lower platform 404 longitudinal length $L_L$ is equal to or less than the upper platform 402 longitudinal length $L_U$.

The connecting member or biasing member 406 operably connects the forward end 418 of the upper platform 402 and the forward end 426 of the lower platform 404, wherein the biasing member 406 positions the upper platform 402 and the lower platform 404 substantially in parallel along the respective axis. The biasing member 406 further functions to resist movement between the upper platform 402 and the lower platform 404, particularly when the platforms are caused to split apart such as in the presence of a shingle positioned therebetween. In this instance, the biasing member 406 biases the upper platform 402 and the lower platform 404 towards each other. The upper platform 402 and the lower platform 404 form a narrow column 430 therebetween adapted to receive and grip a segment of a shingle 200 therein. In the illustrated version, the biasing member 406 comprises a U-shaped joint portion preferably manufactured of strong plastic or composite material allowing moderate flexing at the joint.

Figure 35:
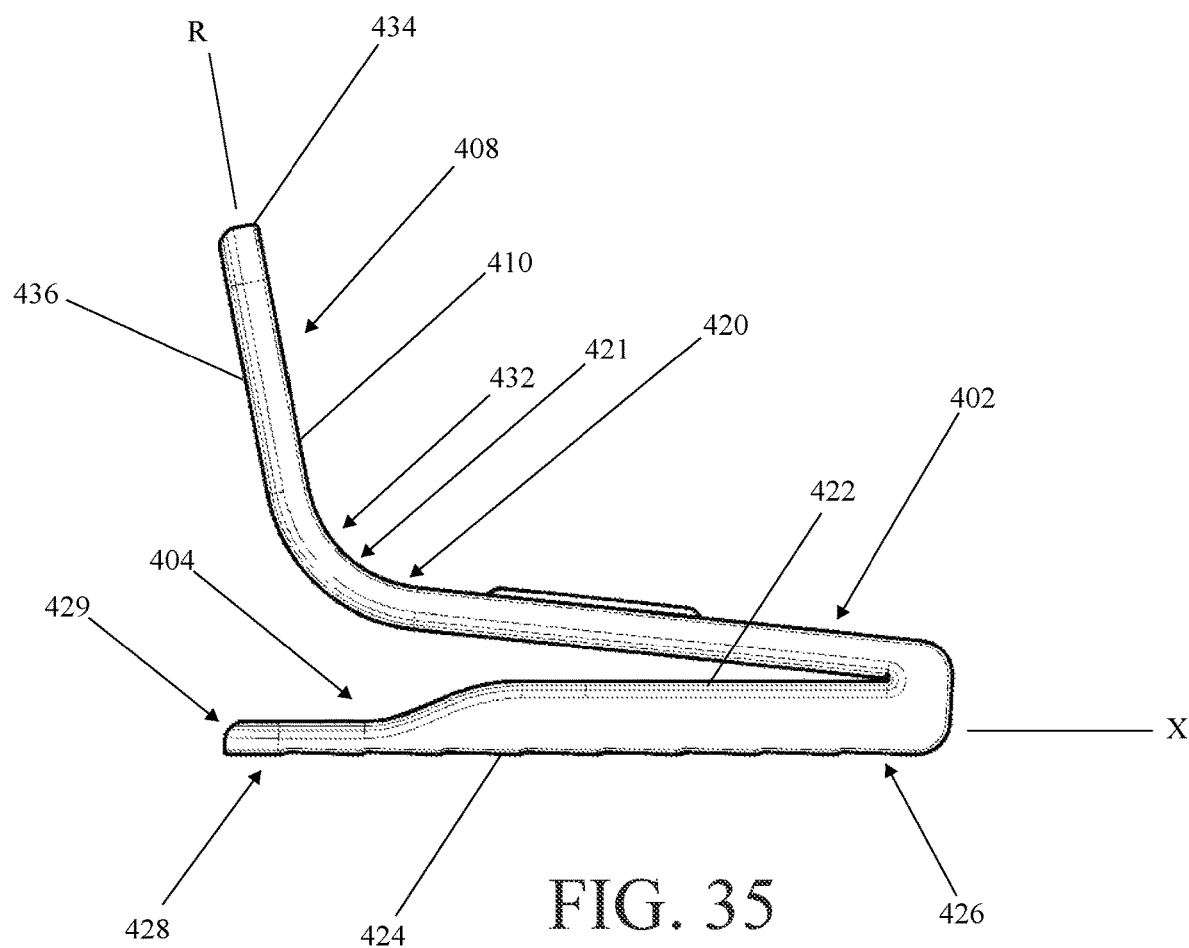
FIG. 35 is a left-side elevation view of the version shown in FIG. 27.
Figure 36:
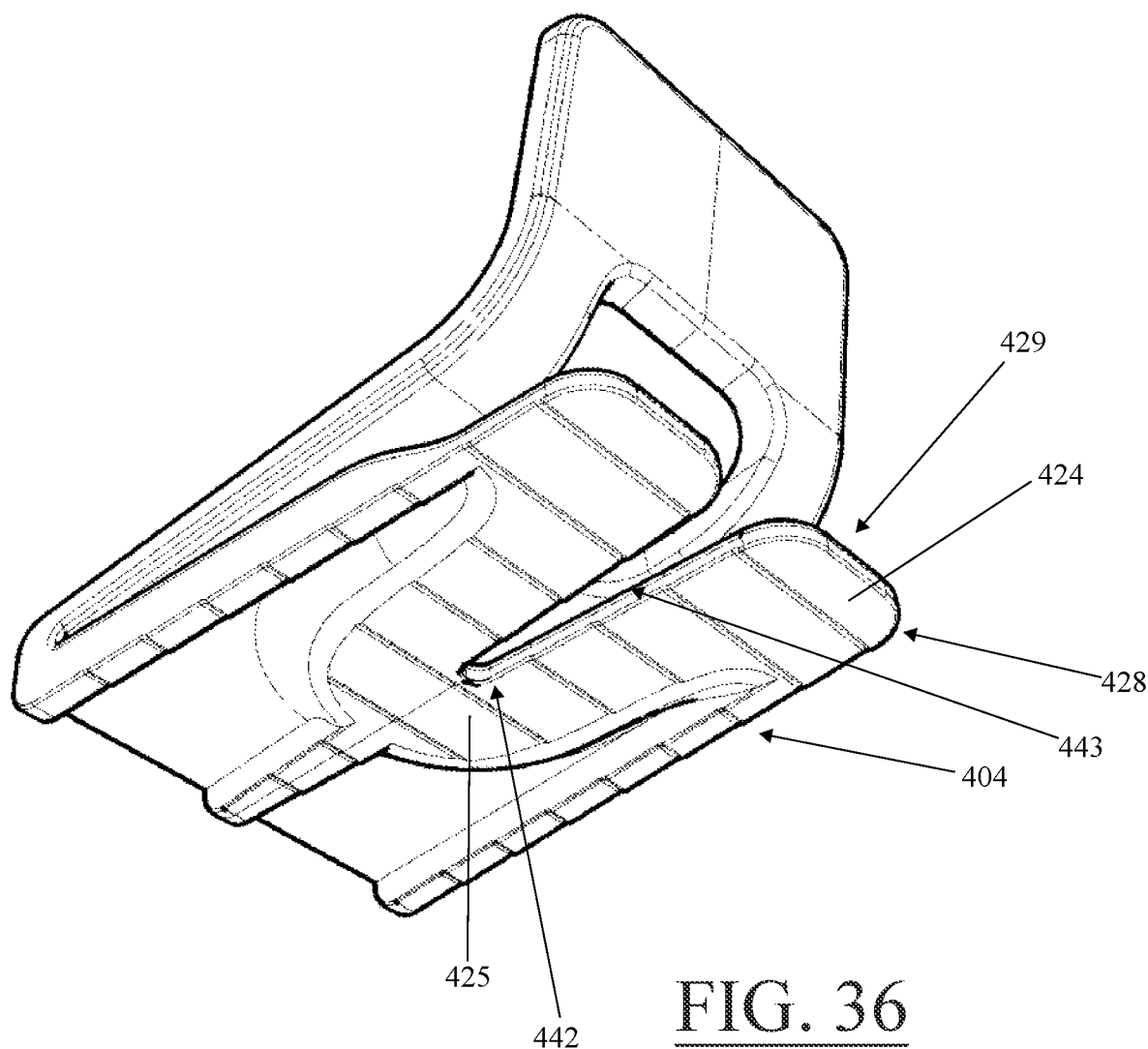
FIG. 36 is a bottom side perspective view of the version shown in FIG. 27.

As best shown in FIG. 35, the tab member 408 generally extends upward at an angle from the rear end 420 of the upper platform 402 along a tab member 408 longitudinal axis R terminating at an upper edge 434. The tab member 408 generally includes a planar body having a base 432 which integrally forms a joint 421 with the rear end 420 of the upper platform 402. The tab member 408 having a rear surface 436 and a front face 410 which is adapted to display the visual identifier 412 viewable from the perspective of a person standing on the ground. Preferably, the angle t formed between the lower platform 404 longitudinal axis X and the tab member 408 longitudinal axis R is between 80-180 degrees, most preferably about 105 degrees. The desired angle t may be adjustable in order to better display the visual identifier depending on the pitch of the roof and the viewing distance. Thus, the tab member 408 may be configured to flexibly move forward or rearward relevant to the upper platform 402 in order to adjust the angle t by providing flexible characteristics at the joint 421.

Figure 31:
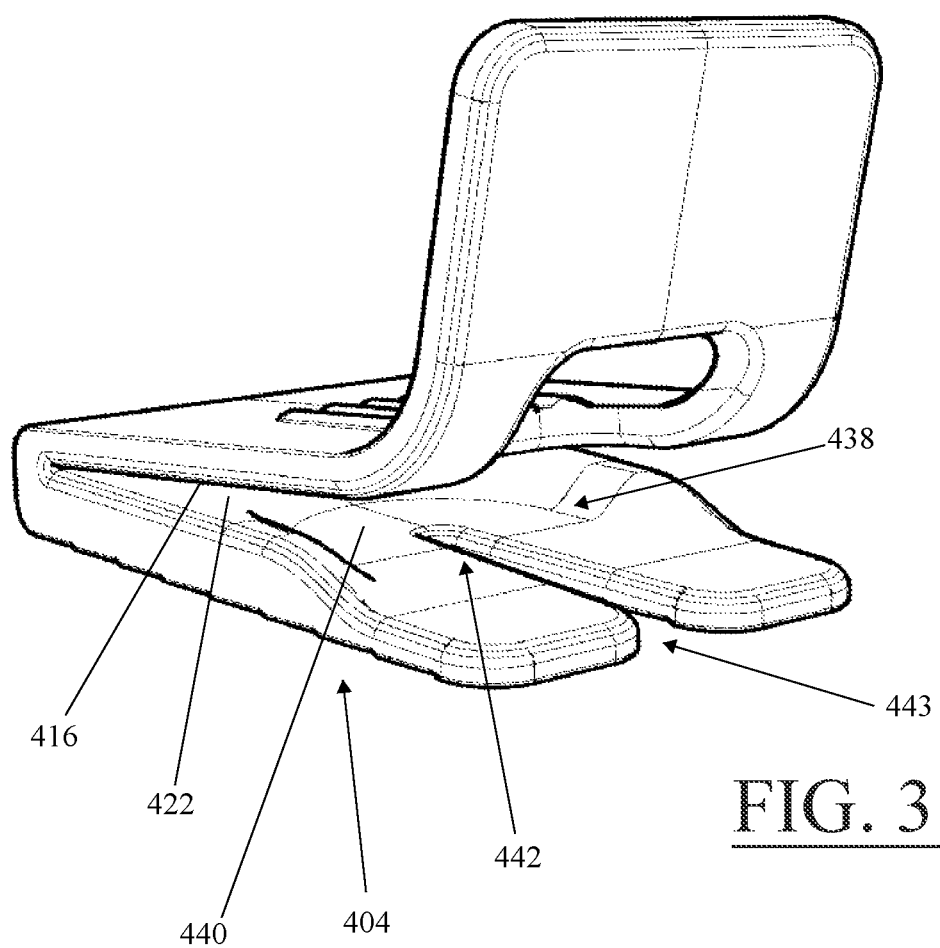
FIG. 31 is a right-side, rear perspective view of the version shown in FIG. 27.
Figure 32:
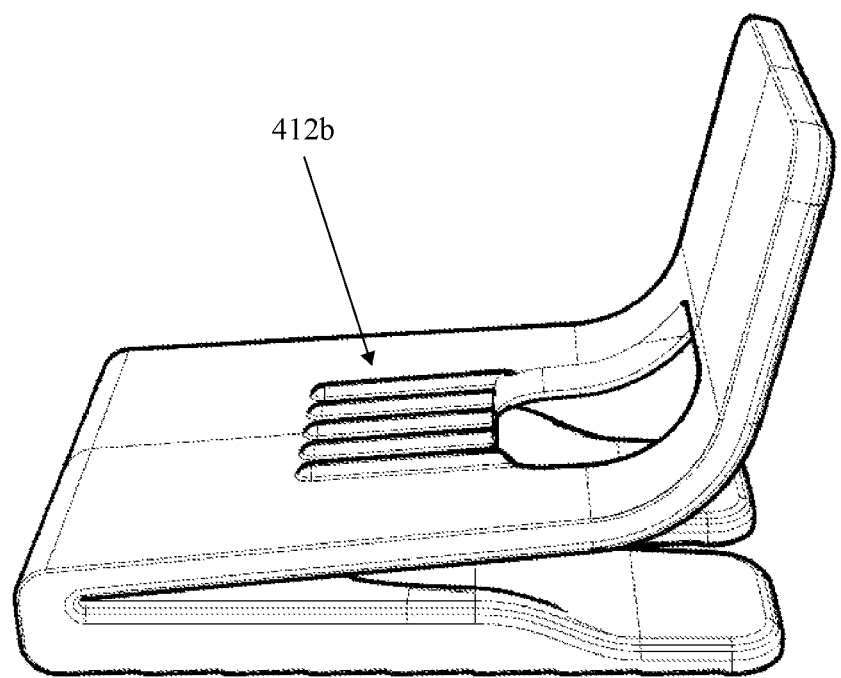
FIG. 32 is a right-side perspective view of the version shown in FIG. 27.
Figure 33:
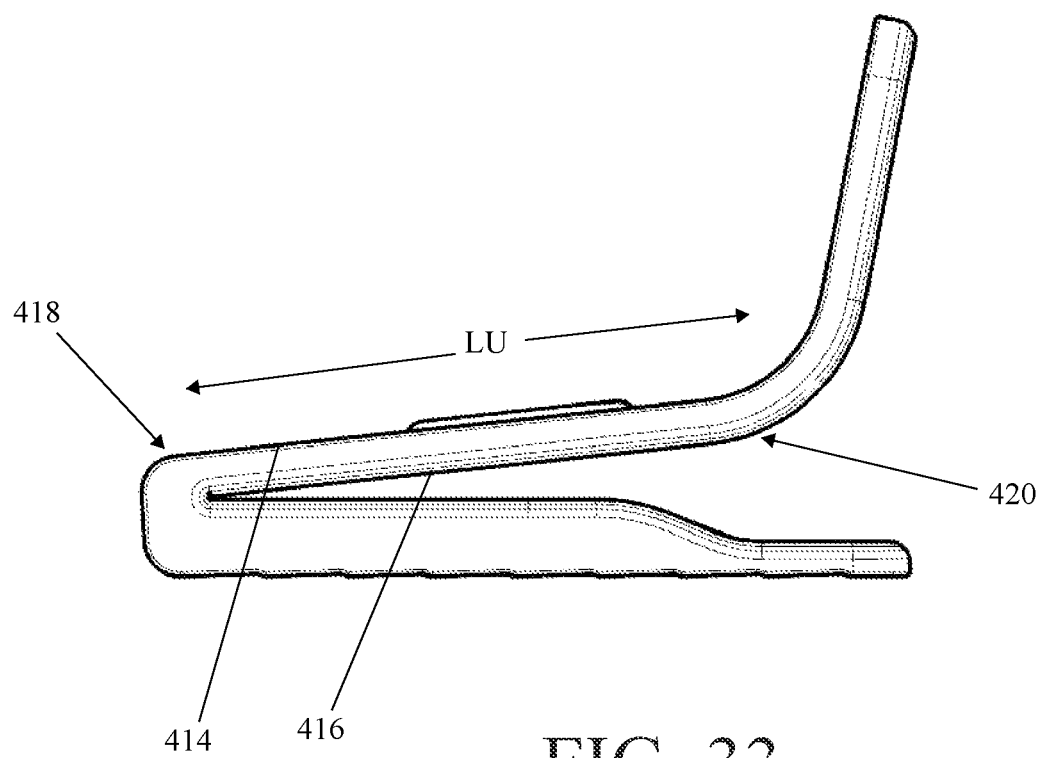
FIG. 33 is a right-side elevation view of the version shown in FIG. 27.
Figure 34:
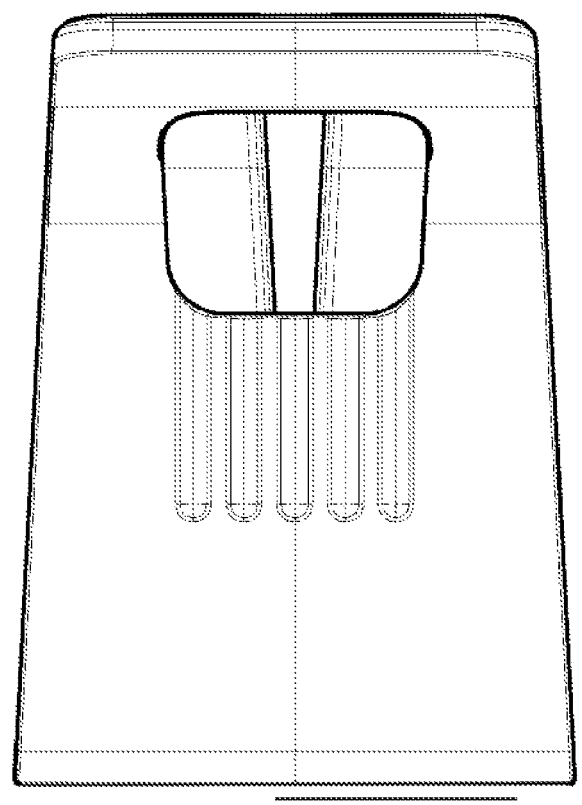
FIG. 34 is a top plan view of the version shown in FIG. 27.

In a version of the invention and as best illustrated by FIG. 31, the lower platform 404 further includes a recessed portion or recessed channel 438 positioned at a midpoint along the length $L_L$ of the body of the lower platform 404. The recessed portion 438 positioned aft of the lower platform 404 top engagement surface 422 and having a depth D. The recessed portion 438 includes an embedded flat upward facing surface 440 positioned at a depth below the lower platform 404 top engagement surface 422 and having a central nail passage or hole 442 extending through the body of the lower platform 404 and exiting at the bottom flat surface 425 (See FIG. 36). The bottom flat surface 425 is adapted to seat flush with the top surface 230 of the plywood deck 208 (See FIG. 12 and FIG. 13). The recessed portion 438 is operably configured to receive and support a nail 204 in order to affix the identification clip 400 to a roof shingle 200. Preferably, the recessed portion 438 is dimension to fit and receive an umbrella type roofing nail 204 or a nail including a washer. The recessed portion 438 configuration allows the identification clip 400 to be attached without causing damage to the shingle 200 or surrounding shingles. In the version, the central nail portion 442 extends rearward from the center of the flat upward facing surface 440 forming a slot 443 terminating at the rear end 428 of the lower platform 404.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. An identification clip for visually marking a damaged shingle, the identification clip comprising:
    an upper platform extending between a forward end and a rear end along an upper platform longitudinal axis, the upper platform having a top surface and a bottom engagement surface;
    a lower platform extending between a forward end and a rear end along a lower platform longitudinal axis, the lower platform having a top engagement surface extending rearward from the forward end, a recessed portion extending aft of the top engagement surface and terminating at the rear end, the recessed portion having an upward facing flat surface positioned lower than the top engagement surface, and a central nail portion extending rearward within the recessed portion from a central point a slot and terminating at an opening at the rear end which is operably configured to receive and support a nail therethrough;
    a biasing member connecting the forward end of the upper platform and the forward end of the lower platform, wherein the biasing member urges the upper platform and the lower platform substantially in parallel forming a narrow column between the bottom engagement surface and the top engagement surface adapted to receive and grip a segment of the shingle therein; and
    a tab member having a planar body extending between a base and an upper edge along a tab member longitudinal axis, the tab member extends upward from the rear of the upper platform from a joint, the tab comprising a front planar face.

2. The identification clip of claim 1, wherein the joint formed between the rear end of the upper platform and the base of the tab member is flexible allowing adjustment of an angle formed between the lower platform longitudinal axis and the tab member longitudinal axis.

3. The identification clip of claim 2, further comprising an angled wedge portion extending rearward and downward between the lower platform, top engagement surface and the lower platform, recessed portion.

4. The identification clip of claim 3, wherein the upper platform, top surface further comprises a reinforced hammer contact surface operably positioned above the central point, the reinforced hammer contact surface having a plurality of semi-embedded parallel ribs.

5. The identification clip of claim 4, wherein the angle formed between the lower platform longitudinal axis and the tab member longitudinal axis is between 80-180 degrees.

6. The identification clip of claim 5, wherein the biasing member comprises a curved portion having a semi-circular cross section.

7. The identification clip of claim 6, wherein the lower platform bottom surface further comprises a plurality of laterally extending ribs forming channels therebetween.

8. The roof shingle identification clip of claim 7, further comprising a visual identifier displayed on the face of the tab member.

9. The identification clip of claim 8, wherein the angle formed between the lower platform longitudinal axis and the tab member longitudinal axis is approximately 95 degrees.

10. The identification clip of claim 1, further comprising an angled wedge portion extending rearward and downward between the lower platform, top engagement surface and the lower platform, recessed portion.

11. The identification clip of claim 10, wherein the upper platform, top surface further comprises a reinforced hammer contact surface operably positioned above the central point, the reinforced hammer contact surface having a plurality of semi-embedded parallel ribs.

12. The identification clip of claim 11, further comprising a visual identifier displayed on the face of the tab member.

13. The identification clip of claim 12, wherein the biasing member comprises a curved portion having a semi-circular cross section.

14. The identification clip of claim 13, wherein the lower platform bottom surface further comprises a plurality of laterally extending ribs forming channels therebetween.

* * * * *